US012627961B2

(12) United States Patent
Rej et al.

(10) Patent No.: US 12,627,961 B2
(45) Date of Patent: May 12, 2026

(54) ALERT AND WARNING MESSAGE PROTECTION IN MSIM

(71) Applicant: QUALCOMM Incorporated, San Diego, CA (US)

(72) Inventors: Rishav Rej, San Diego, CA (US); Qingxin Chen, San Diego, CA (US); Subashini Krishnamurthy, San Diego, CA (US); Bhupesh Manoharlal Umatt, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/669,377

(22) Filed: May 20, 2024

(65) Prior Publication Data

US 2024/0314533 A1 Sep. 19, 2024

Related U.S. Application Data

(62) Division of application No. 17/302,317, filed on Apr. 29, 2021, now Pat. No. 12,010,599.

(60) Provisional application No. 63/030,814, filed on May 27, 2020.

(51) Int. Cl.
| | |
|---|---|
| *H04W 88/06* | (2009.01) |
| *H04W 4/90* | (2018.01) |
| *H04W 72/30* | (2023.01) |
| *H04W 72/566* | (2023.01) |

(52) U.S. Cl.
CPC ............. *H04W 4/90* (2018.02); *H04W 72/30* (2023.01); *H04W 72/566* (2023.01); *H04W 88/06* (2013.01)

(58) Field of Classification Search
CPC ....... H04W 88/06; H04W 72/30; H04W 4/90; H04W 72/566
See application file for complete search history.

(56) References Cited

U.S. PATENT DOCUMENTS

| | | |
|---|---|---|
| 2009/0228917 A1 | 9/2009 | Yun |
| 2013/0150096 A1 | 6/2013 | Hanchate et al. |
| 2015/0146707 A1* | 5/2015 | Jung ................... H04W 12/068 |
| | | 370/338 |

(Continued)

OTHER PUBLICATIONS

International Preliminary Report on Patentability—PCT/US2021/033000—The International Bureau of WIPO—Geneva, Switzerland—Dec. 8, 2022.

(Continued)

*Primary Examiner* — Dai Phuong
(74) *Attorney, Agent, or Firm* — Arent Fox LLP/Qualcomm

(57) ABSTRACT

An apparatus for wireless communication is provided. The apparatus is configured to obtain, based on a first mobile alert associated with a first subscriber identity module (SIM) being scheduled for broadcast from a first network, an indication of receiver resources assigned for receiving the first mobile alert associated with the first SIM. The apparatus is further configured to refrain, based at least in part on the indication, from receiving a second mobile alert associated with a second SIM scheduled for broadcast from a second network. The first mobile alert and the second mobile alert may be associated with messages from at least one of a CMAS or an ETWS.

17 Claims, 16 Drawing Sheets

(56) References Cited

U.S. PATENT DOCUMENTS

| | | | | |
|---|---|---|---|---|
| 2015/0296520 | A1* | 10/2015 | Batchu | H04W 48/16 |
| | | | | 455/434 |
| 2017/0215078 | A1* | 7/2017 | Mochizuki | H04W 84/10 |
| 2017/0230932 | A1 | 8/2017 | Challa et al. | |
| 2017/0272925 | A1 | 9/2017 | Rupanagudi Venkata et al. | |
| 2017/0332222 | A1 | 11/2017 | Raghunathan et al. | |
| 2018/0132289 | A1 | 5/2018 | Zhao et al. | |
| 2018/0183655 | A1 | 6/2018 | Gupta et al. | |
| 2018/0255450 | A1* | 9/2018 | Kumar | H04W 76/28 |
| 2020/0252793 | A1* | 8/2020 | Chang | H04W 12/08 |
| 2021/0377716 | A1 | 12/2021 | Rej et al. | |
| 2022/0141920 | A1 | 5/2022 | Kavuri et al. | |
| 2022/0210756 | A1* | 6/2022 | Kumar | H04W 8/18 |
| 2022/0248362 | A1* | 8/2022 | Shaheen | H04W 8/04 |
| 2022/0256497 | A1* | 8/2022 | Hong | H04W 76/15 |
| 2022/0256500 | A1 | 8/2022 | Gurumoorthy et al. | |
| 2023/0047213 | A1 | 2/2023 | Chen et al. | |

OTHER PUBLICATIONS

International Search Report and Written Opinion—PCT/US2021/033000—ISA/EPO—Aug. 6, 2021.
Shi Y., et al., "Reinforcement Learning for Dynamic Resource Optimization in 5G Radio Access Network Slicing", 2020 IEEE 25th International Workshop on Computer Aided Modeling and Design of Communication Links and Networks (CAMAD), Sep. 14, 2020, 6 Pages.

* cited by examiner

Figure 11:
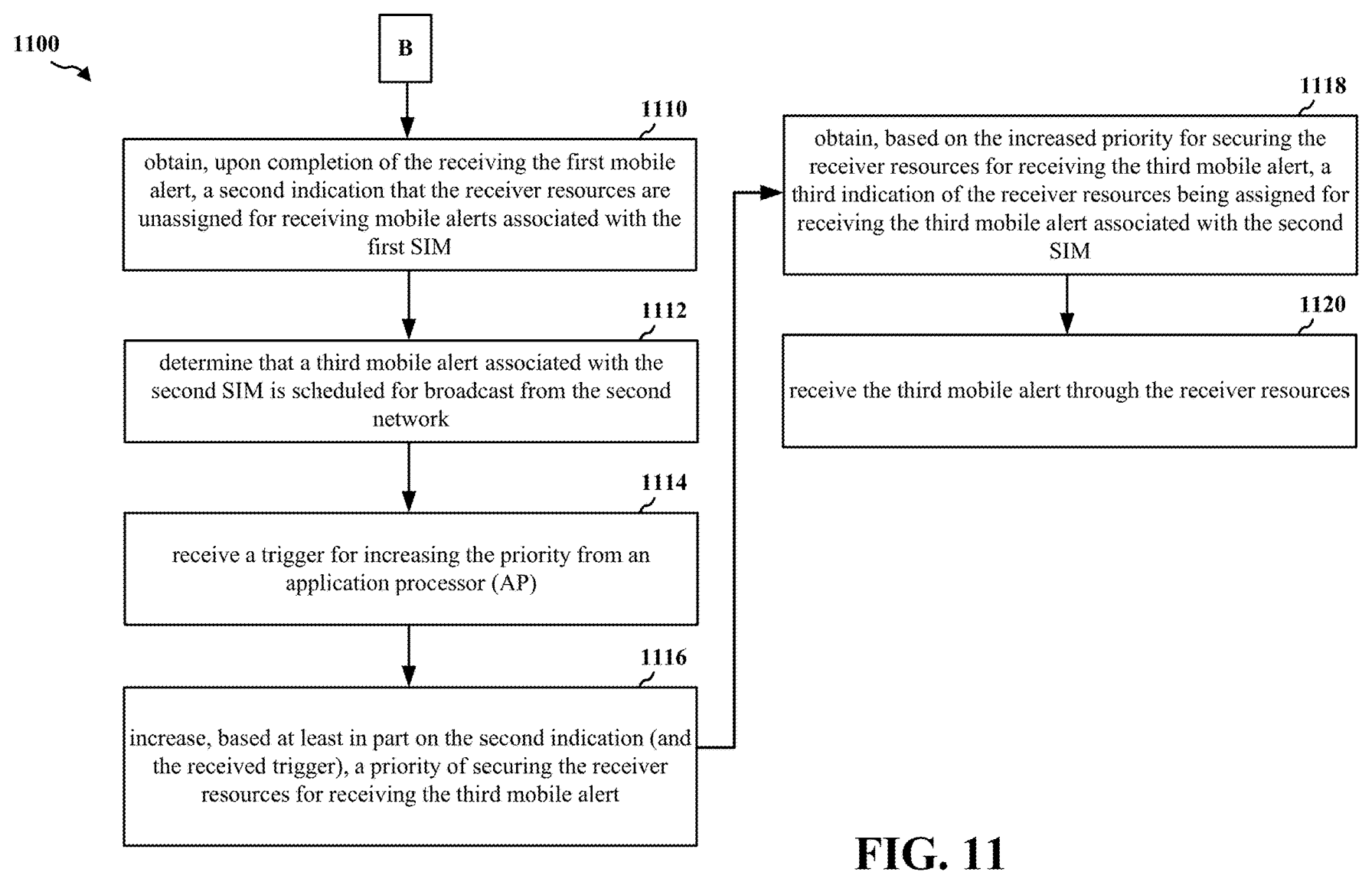

1100

B

1110 obtain, upon completion of the receiving the first mobile alert, a second indication that the receiver resources are unassigned for receiving mobile alerts associated with the first SIM

1112 determine that a third mobile alert associated with the second SIM is scheduled for broadcast from the second network

1114 receive a trigger for increasing the priority from an application processor (AP)

1116 increase, based at least in part on the second indication (and the received trigger), a priority of securing the receiver resources for receiving the third mobile alert

1118 obtain, based on the increased priority for securing the receiver resources for receiving the third mobile alert, a third indication of the receiver resources being assigned for receiving the third mobile alert associated with the second SIM

1120 receive the third mobile alert through the receiver resources

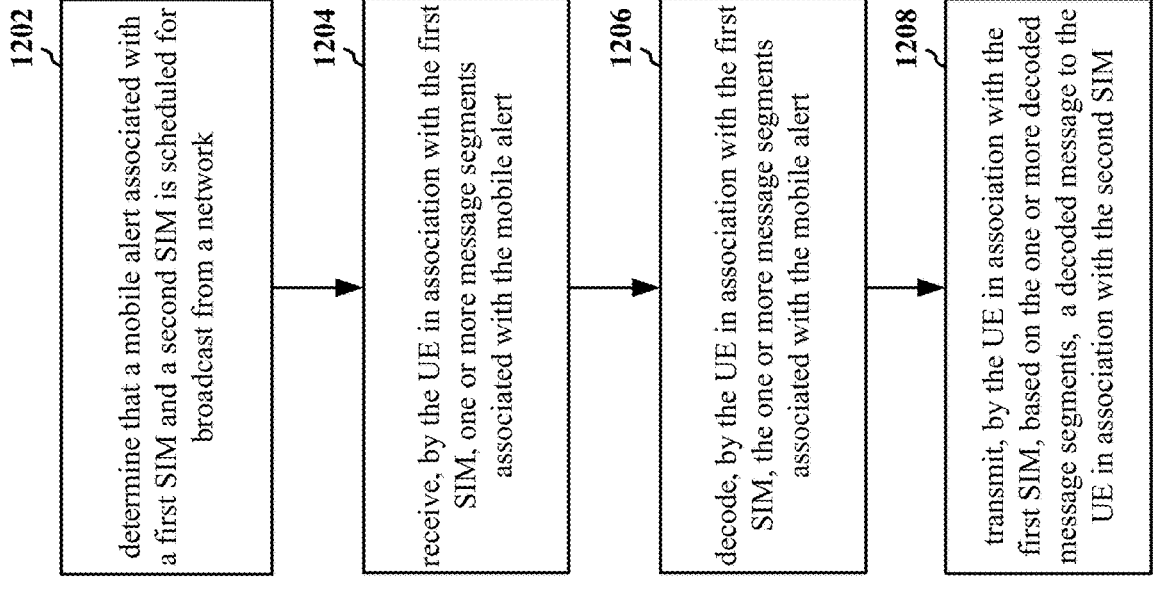

1200

1202 determine that a mobile alert associated with a first SIM and a second SIM is scheduled for broadcast from a network 1204 receive, by the UE in association with the first SIM, one or more message segments associated with the mobile alert 1206 decode, by the UE in association with the first SIM, the one or more message segments associated with the mobile alert 1208 transmit, by the UE in association with the first SIM, based on the one or more decoded message segments, a decoded message to the UE in association with the second SIM

1300

1302 receive a mobile alert from a first SIM

1304 send a trigger to a second SIM to increase a priority for obtaining receiver resources for receiving mobile alerts associated with the second SIM

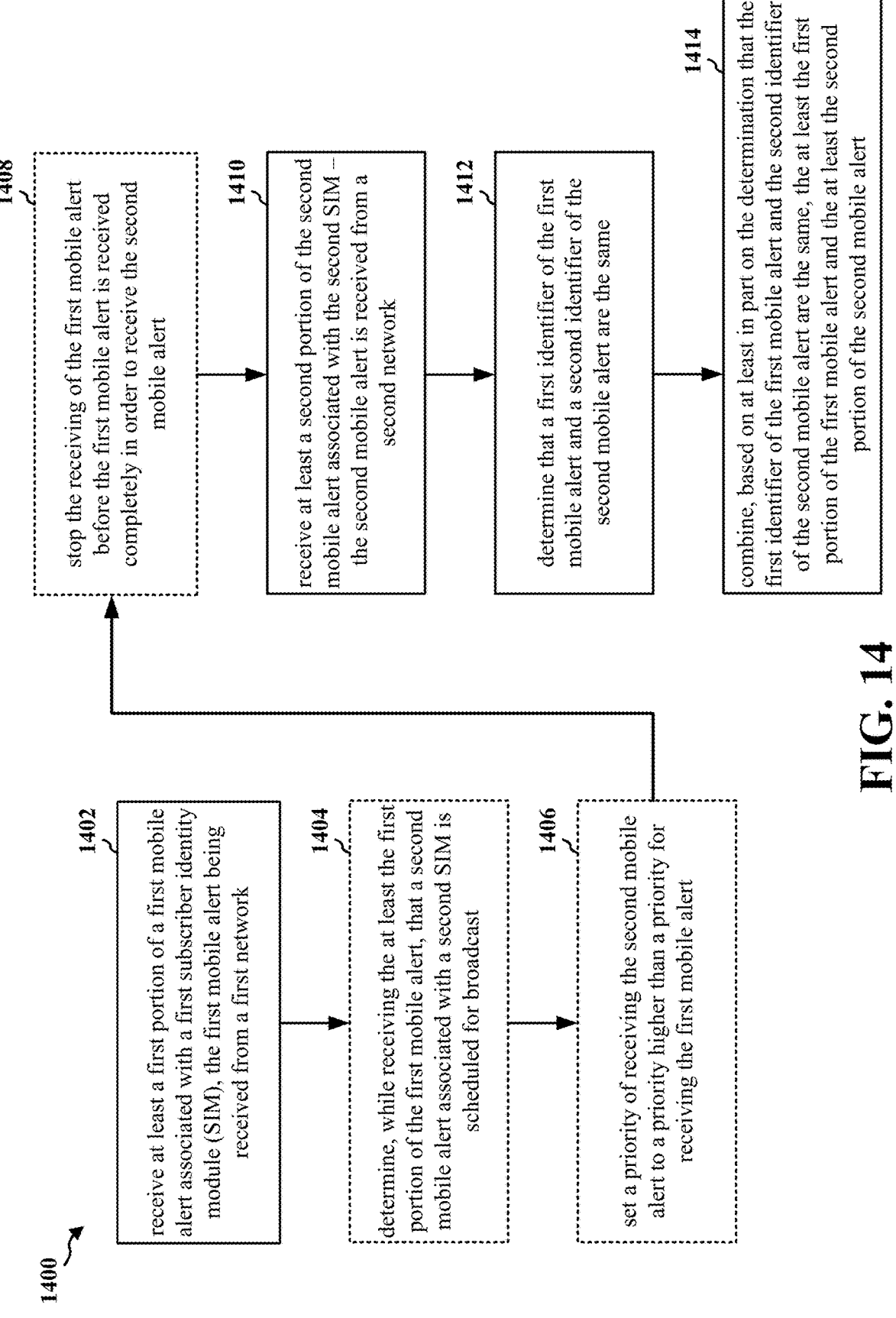

1402 — receive at least a first portion of a first mobile alert associated with a first subscriber identity module (SIM), the first mobile alert being received from a first network 1404 — determine, while receiving the at least the first portion of the first mobile alert, that a second mobile alert associated with a second SIM is scheduled for broadcast 1406 — set a priority of receiving the second mobile alert to a priority higher than a priority for receiving the first mobile alert 1408 — stop the receiving of the first mobile alert before the first mobile alert is received completely in order to receive the second mobile alert 1410 — receive at least a second portion of the second mobile alert associated with the second SIM – the second mobile alert is received from a second network 1412 — determine that a first identifier of the first mobile alert and a second identifier of the second mobile alert are the same 1414 — combine, based on at least in part on the determination that the first identifier of the first mobile alert and the second identifier of the second mobile alert are the same, the at least the first portion of the first mobile alert and the at least the second portion of the second mobile alert

ALERT AND WARNING MESSAGE PROTECTION IN MSIM

CROSS-REFERENCE TO RELATED APPLICATIONS

This application is a divisional application of U.S. patent application Ser. No. 17/302,317, entitled ALERT AND WARNING MESSAGE PROTECTION IN MSIM," and filed on Apr. 29, 2021, which claims the priority of U.S. Provisional Application Ser. No. 63/030,814, entitled "ALERT AND WARNING MESSAGE PROTECTION IN MSIM" and filed on May 27, 2020, of which are expressly incorporated by reference herein in their entirety.

BACKGROUND

Technical Field

The present disclosure relates generally to communication systems, and more particularly, to alert/warning message protection in multi subscriber identity (or identification) module (SIM) (MSIM).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A UE that utilizes a single receiver for receiving alert/warning messages from a plurality of SIMs may lose some or all of the alert/warning messages in some circumstances. Accordingly, there is a need for alert/warning message protection in MSIM. Different configurations/approaches are provided infra, including a first-come, first-served (FCFS) approach, an application processor (AP) trigger approach, a message stitching approach, and a single SIM (SSIM) approach.

In an aspect of the disclosure, a method, a computer-readable medium, and an apparatus are provided. The apparatus may be a UE, and specifically a cellular baseband processor/modem of the UE. The apparatus is configured to obtain, based on a first mobile alert associated with a first subscriber identity module (SIM) being scheduled for broadcast from a first network, an indication of receiver resources assigned for receiving the first mobile alert associated with the first SIM. The apparatus is further configured to refrain, based at least in part on the indication, from receiving a second mobile alert associated with a second SIM scheduled for broadcast from a second network.

In one configuration, to obtain the indication of the receiver resources being assigned for receiving the first mobile alert associated with the first SIM, the apparatus is configured to lock a transceiver resource management (TRM) module from requesting the receiver resources for receiving mobile alerts associated with other SIMs other than the first SIM.

In one configuration, the first mobile alert and the second mobile alert are associated with messages from at least one of a commercial mobile alert system (CMAS) or an earthquake and tsunami warning system (ETWS).

In one configuration, the apparatus is further configured to obtain, upon completion of the receiving the first mobile alert, a second indication that the receiver resources are unassigned for receiving mobile alerts associated with the first SIM.

In one configuration, to obtain the second indication of the receiver resources being unassigned for receiving the first mobile alert associated with the first SIM, the apparatus is configured to unlock a TRM module from being unable to request the receiver resources for receiving mobile alerts associated with other SIMs other than the first SIM.

In one configuration, the apparatus is further configured to determine that a third mobile alert associated with the second SIM is scheduled for broadcast from the second network, and to increase, based at least in part on the second indication, a priority of securing the receiver resources for receiving the third mobile alert. In addition, the apparatus is configured to obtain, based on the increased priority for securing the receiver resources for receiving the third mobile alert, a third indication of the receiver resources being assigned for receiving the third mobile alert associated with the second SIM. Further, the apparatus is configured to receive the third mobile alert through the receiver resources.

In one configuration, the apparatus is further configured to receive a trigger for increasing the priority from an AP. The priority may be increased based on the received trigger.

In one configuration, the apparatus is further configured to determine that a third mobile alert associated with the first SIM is scheduled for broadcast from the first network, and to obtain, based on the determination that the third mobile alert is scheduled for broadcast, a third indication that the receiver resources are assigned for receiving the third mobile alert associated with the first SIM.

In one configuration, the apparatus is further configured to determining that the third mobile alert and the first mobile alert have a same message identifier (ID), to stop a reception of the third mobile alert based on the determination that the third mobile alert and the first mobile alert have the same message ID, and to obtain a fourth indication that the receiver resources are unassigned for receiving the third mobile alert associated with the first SIM.

In one configuration, the apparatus is further configured to send the first mobile alert to an AP for signaling the first mobile alert to a user of the UE.

In one configuration, the apparatus is further configured to determine that the first mobile alert associated with the first SIM is scheduled for broadcast from the first network.

In one configuration, the apparatus is further configured to determine that the second mobile alert associated with the second SIM is scheduled for broadcast from the second network.

In an aspect of the disclosure, a method, a computer-readable medium, and an apparatus are provided. The apparatus may be a UE, and specifically an application processor of the UE. The apparatus is configured to receive a mobile alert from a first SIM, and to send a trigger to a second SIM to increase a priority for obtaining receiver resources for receiving mobile alerts associated with the second SIM.

In an aspect of the disclosure, a method, a computer-readable medium, and an apparatus are provided. The apparatus may be a UE, and specifically a cellular baseband processor/modem of the UE. The apparatus in association with the first SIM is configured to receive one or more message segments associated with a mobile alert. The apparatus in association with the first SIM is configured to decode the one or more message segments associated with the mobile alert. The apparatus in association with the first SIM is configured to transmit, based on the one or more decoded message segments, a decoded message to the apparatus in association with a second SIM.

In one configuration, the apparatus in association with the first SIM is configured to transmit the decoded message to an application processor (AP) for signaling the mobile alert to a user of the apparatus.

In one configuration, the apparatus in association with the first SIM is configured to transmit a set of message identifiers associated with one or more decoded message segments to the apparatus in association with the second SIM.

In one configuration, the apparatus in association with the second SIM is configured to transmit, based on the received set of message identifiers, the decoded message to the AP for signaling the mobile alert to a user of the apparatus.

In one configuration, the apparatus in association with the second SIM, when transmitting the decoded message to the AP, is configured to determine whether the received set of message identifiers is associated with second SIM, and in response to determining that the received set of message identifiers is associated with the second SIM, that apparatus in association with the second SIM is configured to transmit the decoded message to the AP.

In one configuration, the apparatus operates in a page sharing mode. In one configuration, the apparatus in association with the first SIM is configured to obtain, based on determination that the mobile alerts is scheduled for broadcast, an indication of receiver resources assigned for receiving the one or more mobile alerts.

In one configuration, the mobile alert is associated with messages from at least one of a commercial mobile alert system (CMAS) or an earthquake and tsunami warning system. In one configuration, the one or more message segments are associated with one or more messages from at least one of a CMAS or an ETWS.

In one configuration, the apparatus is configured to determine that the mobile alert associated with at least the first SIM and/or the second SIM is scheduled for broadcast from the network. In one configuration, the mobile alert is associated with at least the first SIM and the second SIM.

In an aspect of the disclosure, a method, a computer-readable medium, and an apparatus are provided. The apparatus may be a UE, and specifically a cellular baseband processor/modem of the UE. The apparatus is configured to receive at least a first portion of a first mobile alert associated with a first SIM. The first mobile alert is received from a first network. The apparatus is further configured to receive at least a second portion of a second mobile alert associated with a second SIM. The second mobile alert is received from a second network. The apparatus is further configured to determine that a first identifier of the first mobile alert and a second identifier of the second mobile alert are the same. The apparatus is further configured to combine, based on at least in part on the determination that the first identifier of the first mobile alert and the second identifier of the second mobile alert are the same, the at least the first portion of the first mobile alert and the at least the second portion of the second mobile alert.

In one configuration, the apparatus is further configured to stop the receiving of the first mobile alert before the first mobile alert is received completely in order to receive the second mobile alert.

In one configuration, the apparatus is further configured to determine, while receiving the at least the first portion of the first mobile alert, that the second mobile alert associated with the second SIM is scheduled for broadcast. In addition, the apparatus is further configured to set a priority of receiving the second mobile alert to a priority higher than a priority for receiving the first mobile alert. In such a configuration, the apparatus is configured to stop receiving the first mobile alert based on the second mobile alert having a higher priority than the first mobile alert.

In one configuration, the apparatus is further configured to send the first mobile alert to an AP for signaling the first mobile alert to a user of the UE.

In an aspect of the disclosure, a method, a computer-readable medium, and an apparatus are provided. The apparatus may be a UE, and specifically an application processor of the UE. The apparatus is configured to determine that a first mobile alert associated with a first non-default SIM is scheduled for broadcast from a first NR network, to determine whether a second default SIM associated with a second NR network is in service or out of service, and to receive the first mobile alert associated with the first non-default SIM based at least in part on the determination that the second default SIM is out of service.

In one configuration, the apparatus is further configured to refrain from receiving the first mobile alert associated with the first non-default SIM based at least in part on the determination that the second default SIM is in service.

In one configuration, the apparatus is further configured to determine, while receiving the first mobile alert, that the second default SIM is in service. In addition, the apparatus is configured to complete the receiving of the first mobile alert. Further, the apparatus is configured to monitor for additional mobile alerts associated with the second default SIM upon completion of the receiving of the first mobile alert.

In one configuration, the apparatus is further configured to send the first mobile alert to an AP for signaling the first mobile alert to a user of the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 11 is a third flowchart of the first method of wireless communication.

FIG. 12 is a flowchart of the second method of wireless communication.

FIG. 14 is a flowchart of a fourth method of wireless communication.

DETAILED DESCRIPTION

Figure 1:
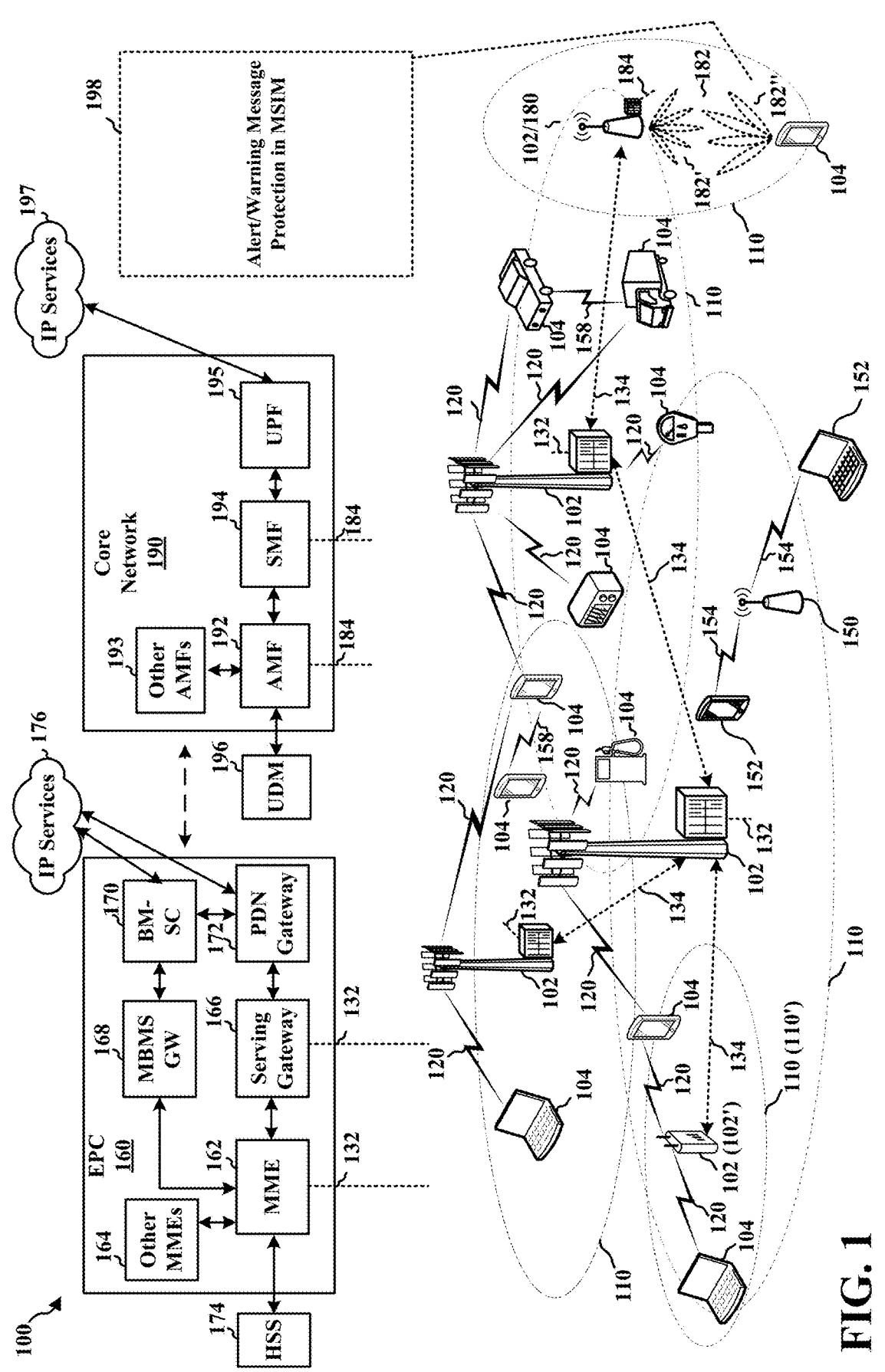
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically crasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage arca 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (cNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHZ spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHZ and 30 GHz, also referred to as centimeter wave. Frequency range bands include frequency range 1 (FR1), which includes frequency bands below 7.225 GHZ, and frequency range 2 (FR2), which includes frequency bands above 24.250 GHz. Communications using the mmW/near mmW radio frequency (RF) band (e.g., 3 GHZ-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. Referring again to FIG. 1, in certain aspects, the UE 104 may be configured for the alert/warning message protection in MSIM as discussed infra (198).

Figures 2A, 2B, 2C, 2D:
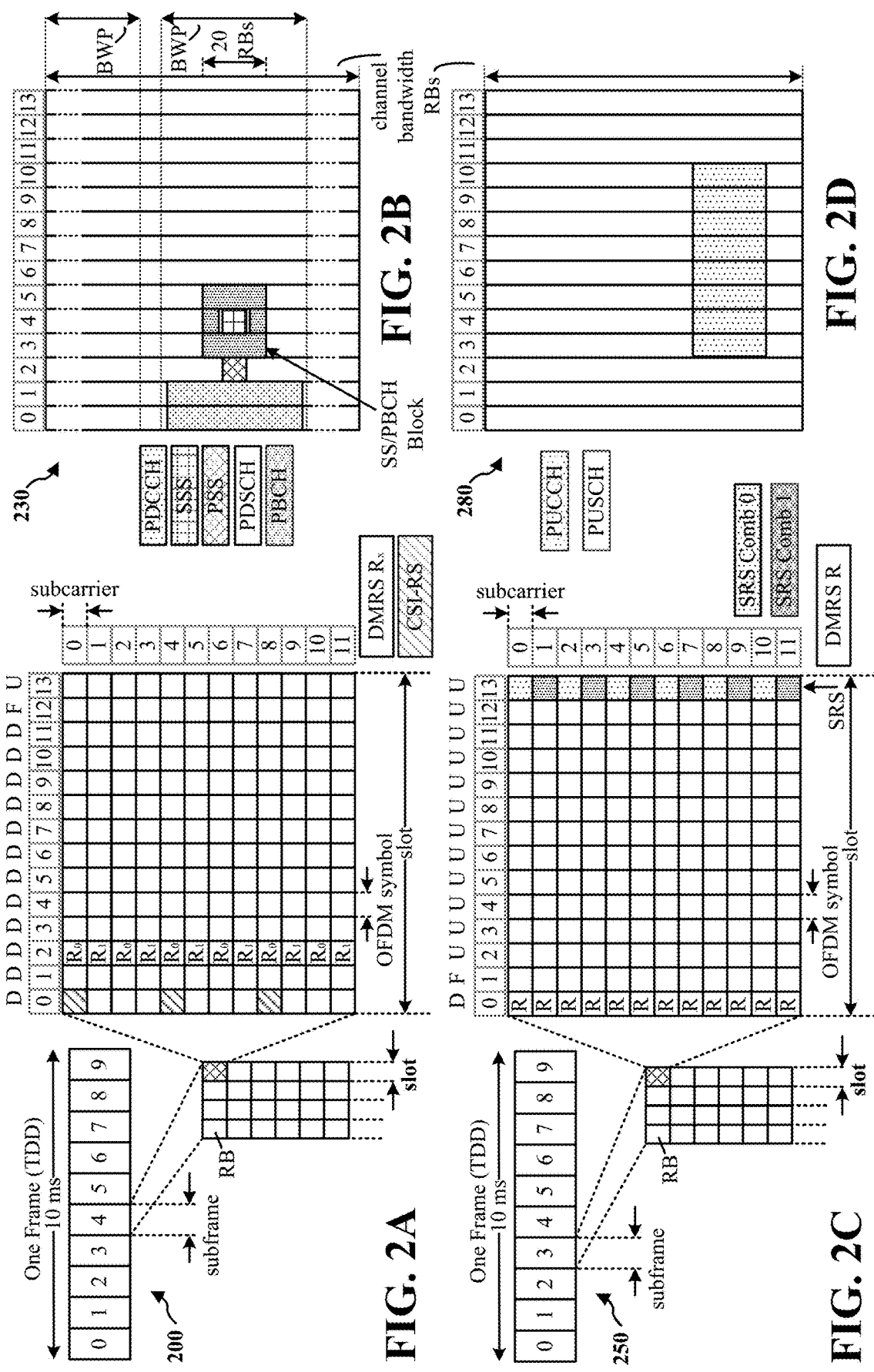
FIGS. 2A, 2B, 2C, and 2D are diagrams illustrating examples of a first 5G NR frame, DL channels within a 5G NR subframe, a second 5G NR frame, and UL channels within a 5G NR subframe, respectively.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
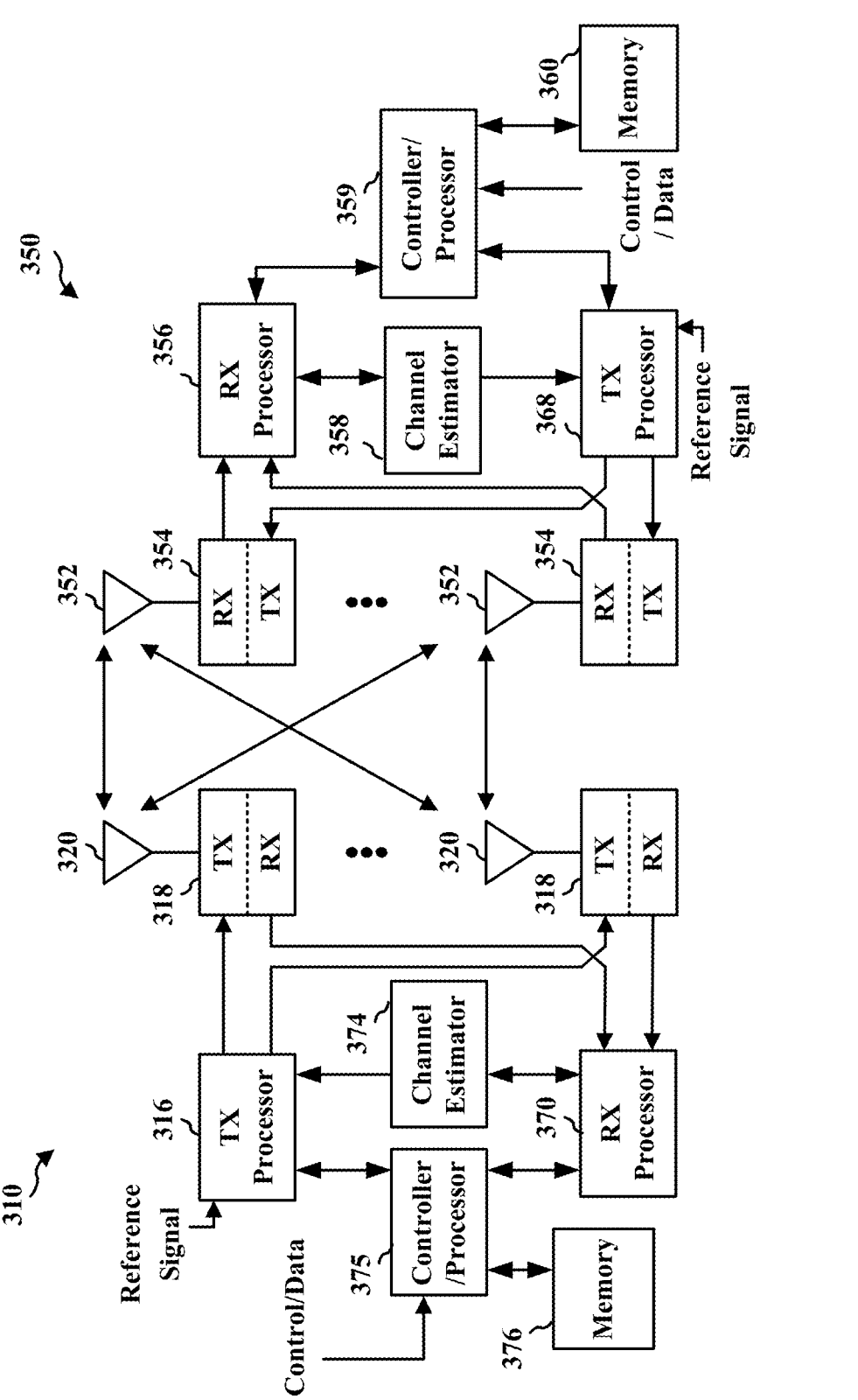
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization. The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations. At least one of the TX processor 368, the RX processor 356, and the controller/processor 359 may be configured to perform aspects in connection with 198 of FIG. 1.

Being able to receive and to process alert/warning messages from multiple subscriptions is critical in MSIM. Each subscription is associated with a different SIM. Examples of warning messages include messages from the ETWS. Examples of alert messages include messages from the CMAS. The network associated with each SIM pages UEs that the network will broadcast SIBs associated with the alert/warning messages. The network broadcasts to UEs a SIB1 indicating a schedule for receiving a SIB12 (or other SIB that includes the alert/warning messages), and subsequently broadcasts the SIB 12 including the alert/warning messages based on the schedule. For each subscription, UEs receive the SIB1 including the SIB12 schedule and the SIB12 message list (including message IDs for the scheduled alert/warning messages), and attempt to receive and to decode the SIB 12 including the alert/warning messages. For example, if a UE includes two SIMs, the UE receives the SIB1 including the SIB 12 schedule associated with a first of the two SIMs, and attempts to receive and to decode the SIB12 including the alert/warning messages for the first SIM. In addition, the UE receives the SIB1 including the SIB12 schedule associated with a second of the two SIMs, and also attempts to receive and to decode the SIB12 include the alert/warning messages for the second SIM. In some situations, there can be a conflict/collision, and the UE may lose alert/warning messages from either or both of the two SIMs. To address the conflict/collision and to help prevent the UE from losing alert/warning messages, different configurations for alert/warning message protection in MSIM are provided, where the UE has a single receiver for receiving and decoding the alert/warning messages. Accordingly, as the UE has a single receiver for receiving and decoding the alert/warning messages, the UE exhibits single radio (SR) dual SIM dual standby (DSDS) (SR-DSDS) behavior. The UE may request TRM resources to read (e.g., to receive and to decode) the alert/warning messages for a particular subscription. The networks may broadcast alert/warning segments (e.g., in LTE/NR) periodically with a specific periodicity, such as for example a multiple of 80 ms. As the periodicity for the alert/warning messages may be the same or multiple of the same value for the different subscriptions and as the UE can only receive on one BWP at one time as a result of the SR-DSDS behavior, collisions of the alert/warning segments from the subscriptions may be quite high. That is, if the alert/warning messages are transmitted from their respective networks (which may be the same network or different networks) at the same time or in overlapping time periods, the UE may fail to receive the alert/warning messages from one or both of the subscriptions. UE RRC behavior (at the baseband processor/modem) is to collect all the segments for a particular alert/warning message before sending the alert/warning message to the AP for display to the user. If a particular segment is not received due to the TRM resource unavailability, the whole alert/warning message may not be displayed. As such, both subscriptions may fail to report an alert/warning message because of a failure to receive a segment.

Figure 4:
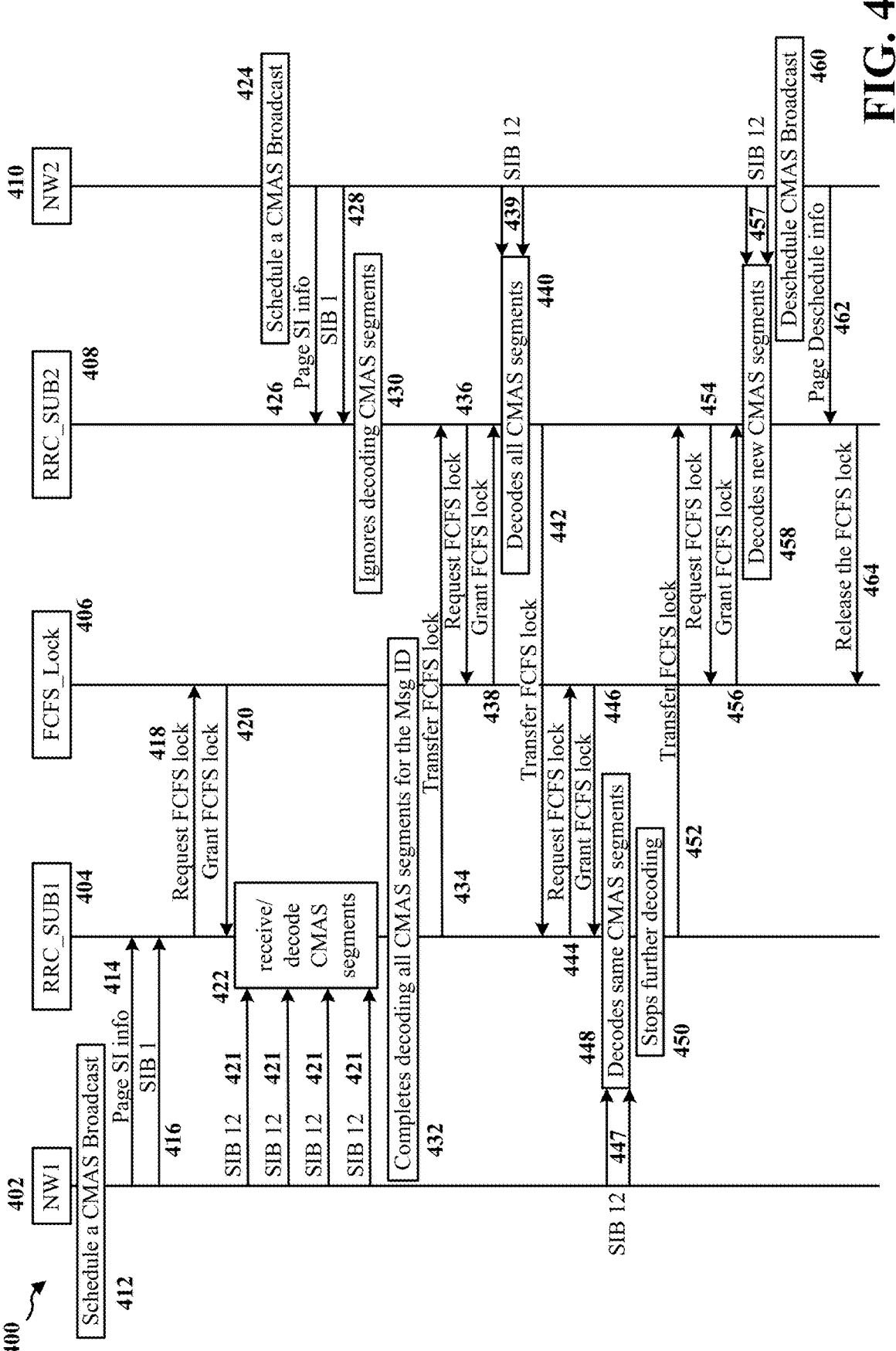
FIG. 4 is a first timing diagram illustrating alert/warning message protection in MSIM using an FCFS approach.
Figure 5:
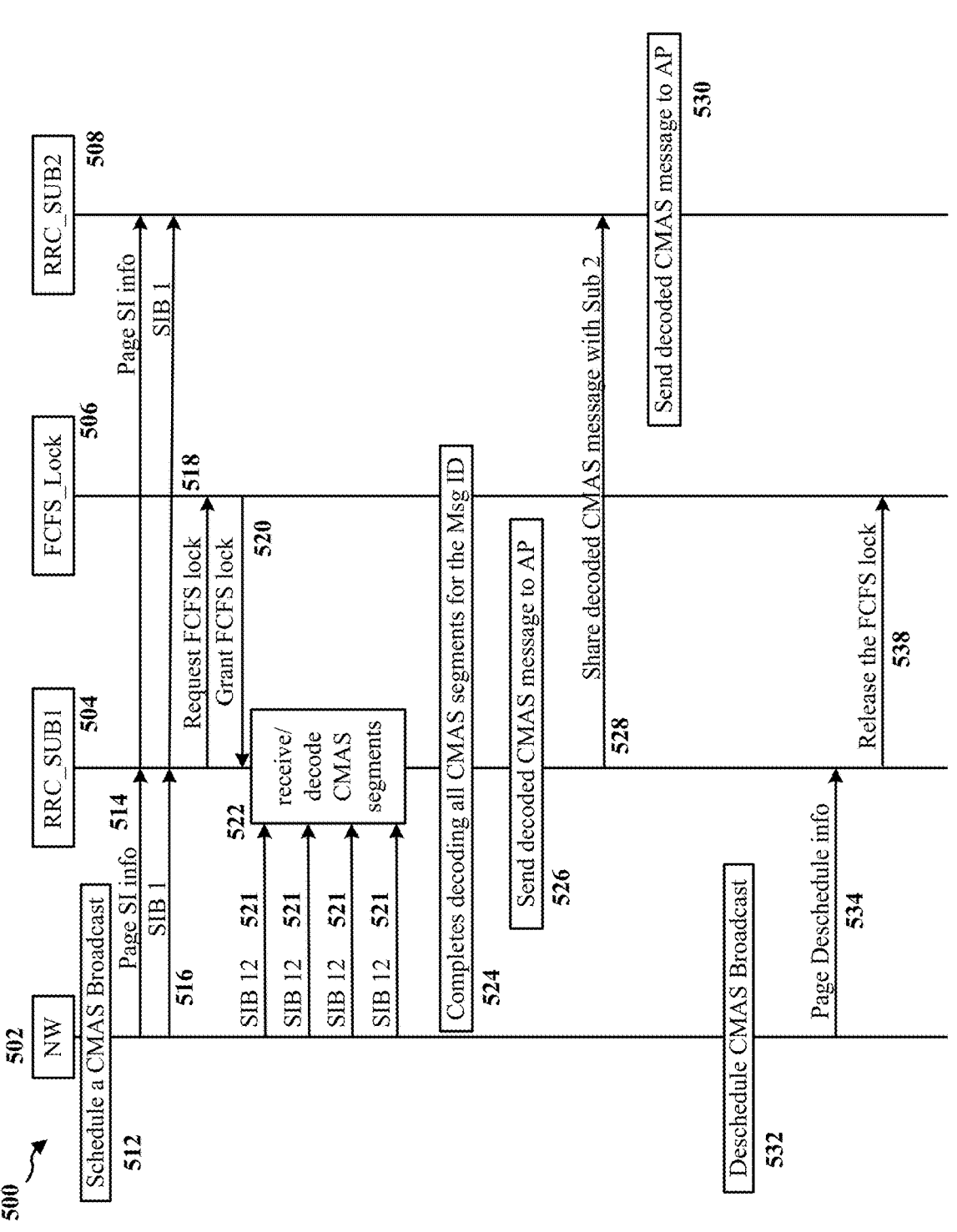
FIG. 5 is a second timing diagram illustrating alert/ warning message protection in MSIM using an FCFS approach while the UE is operating in page sharing mode.
Figure 6:
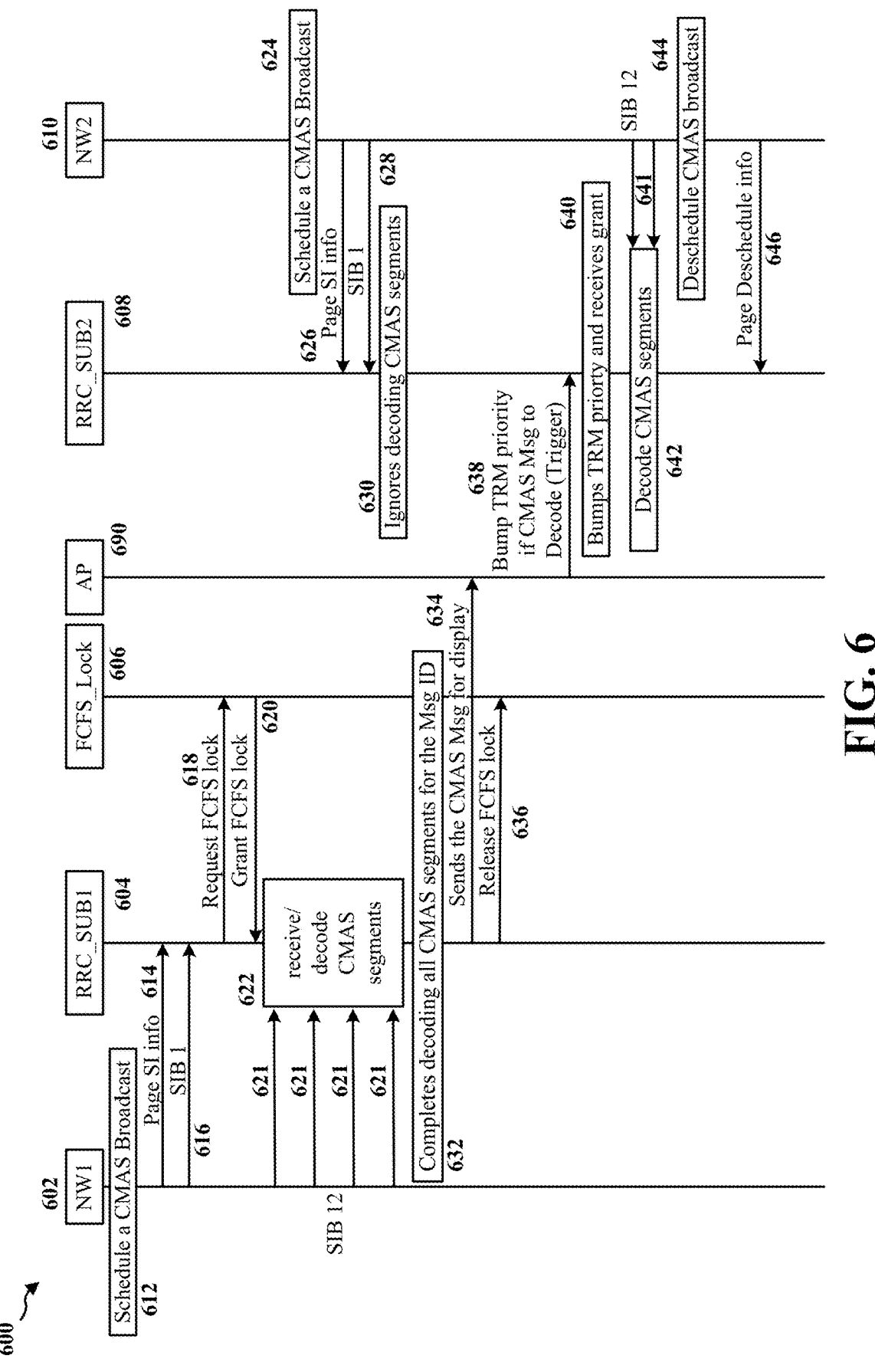
FIG. 6 is a third timing diagram illustrating alert/warning message protection in MSIM using an AP trigger approach.
Figure 7:
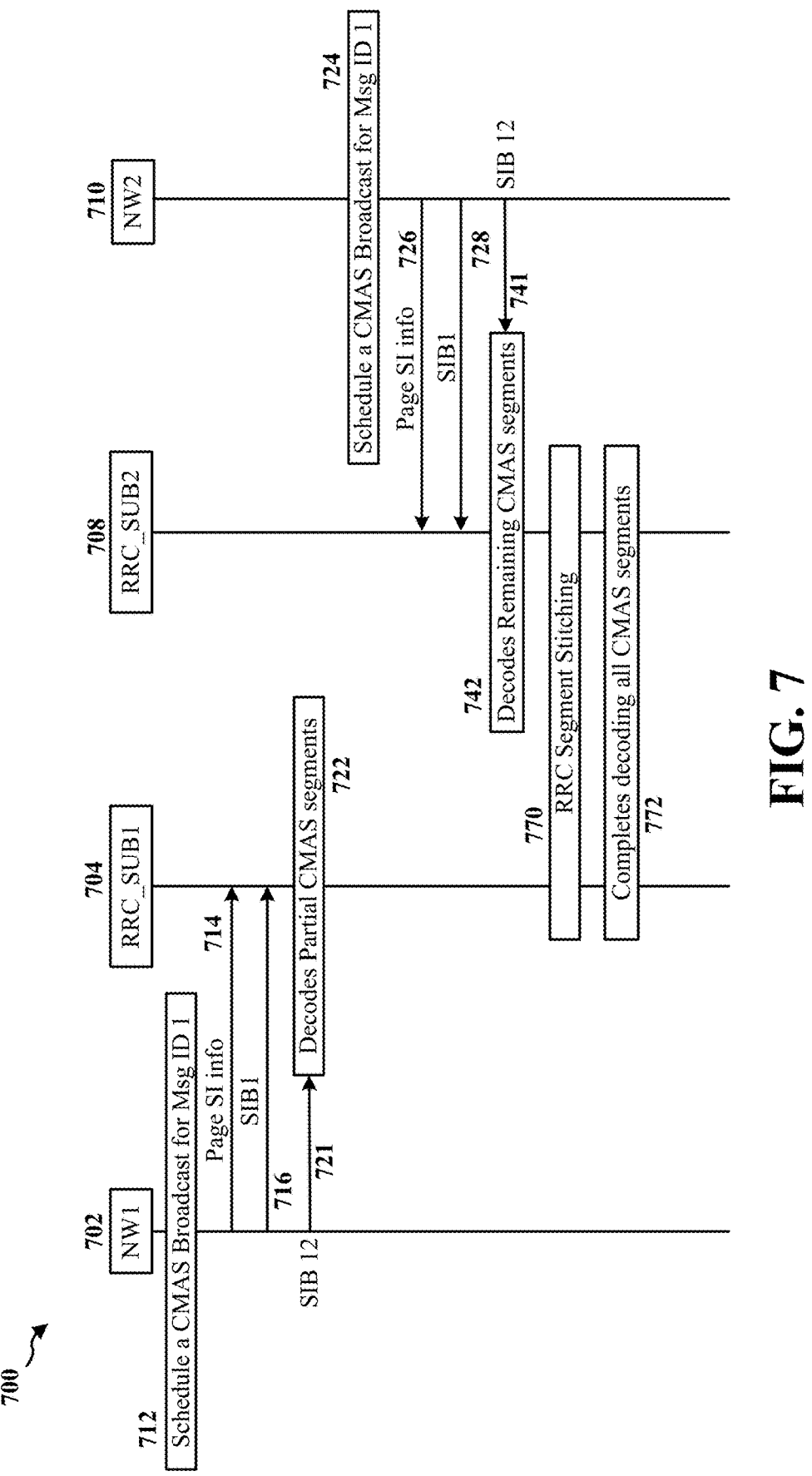
FIG. 7 is a fourth timing diagram illustrating alert/warning message protection in MSIM using a message stitching approach.

In order to facilitate alert/warning message protection in MSIM when the UE exhibits SR-DSDS behavior, five different configurations/approaches are provided with respect to FIGS. 4-8. In FIG. 4, an alert/warning message protection in MSIM is provided using an FCFS approach. In FIG. 5, an alert/warning message protection in MSIM is provided using an FCFS approach while the UE is operating in SR-DSDS page sharing mode. In FIG. 6, an alert/warning message protection in MSIM is provided using an AP trigger approach. In FIG. 7, an alert/warning message protection in MSIM is provided using a message stitching approach. Finally, in FIG. 8, an alert/warning message protection in MSIM is providing using an SSIM approach.

FIG. 4 is a first timing diagram 400 illustrating alert/warning message protection in MSIM using an FCFS approach. The example provided with respect to FIG. 4 is with respect to CMAS messages, but generally, the messages may be any alert/warning messages and may include CMAS messages and/or ETWS messages. The approach applies to SR-DSDS, including normal mode and page sharing mode. As illustrated in FIG. 4, at 412, a first network NW1 (i.e., base station associated with the first network NW1) 402 schedules a CMAS broadcast. At 414, the first network NW1 402 transmits paging information indicating that a SIB1 will be subsequently broadcasted. At 414, a UE receives the paging information from the first network NW1 402. At 416, the first network NW1 402 broadcasts the SIB1, which includes scheduling information (e.g., instances and/or periodicity) for a SIB 12 that contains the CMAS messages. At 416, the UE receives the SIB1 based on the received paging information. For example, the SIB1 is received in association with a first subscription 404. More specifically, a baseband processor (modem) at the UE receives the SIB 1 at an RRC layer, where the SIB1 is associated with the first subscription 404. At 418, the first subscription 404 requests an indication of receiver resources (e.g., an FCFS lock) from an FCFS lock module 406. At 420, the FCFS lock is granted by the FCFS lock module 406. The FCFS lock locks the TRM resources for and assigns the TRM resources to receiving the CMAS segments with the first subscription 404 associated with a first SIM. The FCFS lock also prevents the TRM resources from being used for receiving CMAS segments associated with a second subscription 408 associated with a second SIM. At 421, the first network NW1 402 broadcasts a plurality of SIB 12s including the CMAS segments. At 422, the UE receives the SIB 12s using the TRM resources and begins decoding the CMAS segments received in the SIB12s. The CMAS segments may be associated with one or more message IDs.

At 424, a second network NW2 (i.e., base station associated with the second network NW2) 410 schedules a CMAS broadcast. At 426, the second network NW2 410 transmits paging information indicating that a SIB1 will be subsequently broadcasted. At 426, the UE receives the paging information from the second network NW2 410. At 428, the second network NW2 410 broadcasts the SIB1, which includes scheduling information (e.g., instances and/or periodicity) for the SIB 12 that contains the CMAS messages. At 428, the UE receives the SIB1. For example, the SIB1 is received in association with a second subscription 408. In an aspect, the baseband processor (modem) at the UE receives the SIB1 at an RRC layer, where the SIB1 is associated with the second subscription 408. At 430, as the TRM resources are assigned in association with the first subscription 404, the UE does not request an FCFS lock and ignores receiving and decoding the CMAS segments for the second subscription 408. Without the FCFS lock, had the UE in association with the second subscription 408 utilized the TRM resources to receive the corresponding CMAS message, the UE in association with the first subscription 404 may have failed to fully receive and decode the CMAS segments and may have therefore lost the corresponding CMAS message for the first subscription 404.

At 432, the UE in association with the first subscription 404 completes receiving and decoding all the CMAS segments for the one or more message IDs. Subsequently, at 434, the UE in association with the first subscription 404 releases the FCFS lock or transfers the FCFS lock to the second subscription 408. If the UE releases the FCFS lock (instead of transferring the FCFS lock), at 436, the UE may request the FCFS lock for the second subscription 408 from the FCFS lock module 406. At 438, the FCFS lock is granted by the FCFS lock module 406. The FCFS lock locks the TRM resources for and assigns the TRM resources to receiving the CMAS segments with the second subscription 408 associated with the second SIM. The FCFS lock also prevents the TRM resources from being used for receiving CMAS segments associated with the first subscription 404 associated with the first SIM. At 439, the second network NW2 410 broadcasts a plurality of SIB12s including the CMAS segments. At 440, the UE receives the SIB12s and begins decoding CMAS segments received in the SIB12s. Note that the UE did not receive the CMAS segments associated with the SIB12 scheduled in the SIB1 at 428, but at 440, receives a subsequent broadcast of the SIB12 including CMAS segments. As networks may rebroadcast the same CMAS messages multiple times, the UE may not necessarily lose any CMAS messages due to the delay in receiving and decoding the CMAS messages from the second network NW2 410.

Subsequently, at 442, the UE in association with the second subscription 408 releases the FCFS lock or transfers the FCFS lock to the first subscription 404. If the UE releases the FCFS lock (instead of transferring the FCFS lock), at 444, the UE may request the FCFS lock for the first subscription 404 from the FCFS lock module 406. At 446, the FCFS lock is granted by the FCFS lock module 406. The FCFS lock locks the TRM resources for and assigns the TRM resources to receiving the CMAS segments with the first subscription 404 associated with the first SIM. The FCFS lock also prevents the TRM resources from being used for receiving CMAS segments associated with the second subscription 408.

At 447, the first network NW1 402 broadcasts a plurality of SIB12s including the CMAS segments. At 448, the UE receives and decodes the received CMAS segments. At 450, the UE determines that the UE already received the CMAS segments and the corresponding CMAS message and stops further receiving/decoding of the CMAS segments. Accordingly, in order not to miss any CMAS messages from the second subscription 408, at 452, the UE either transfers the FCFS lock to the second subscription 408 or releases the FCFS lock from the first subscription 404. If the UE releases the FCFS lock (instead of transferring the FCFS lock), at 454, the UE may request the FCFS lock for the second subscription 408 from the FCFS lock module 406. At 456, the FCFS lock is granted by the FCFS lock module 406. The FCFS lock locks the TRM resources for and assigns the TRM resources to receiving the CMAS segments with the second subscription 408 associated with the second SIM. The FCFS lock also prevents the TRM resources from being used for receiving CMAS segments associated with the first subscription 404 associated with the first SIM. At 457, the second network NW2 410 broadcasts a plurality of SIB12s including the CMAS segments. At 458, the UE receives the SIB 12s and receives and decodes the CMAS segments received in the SIB 12s. Thereafter, at 460, the second network NW2 410 de-schedules the CMAS broadcast and, at 462, transmits a page indicating the de-scheduling information. At 462, the UE receives the page including the CMAS broadcast de-scheduling information, and at 464, releases the FCFS lock with the FCFS lock module 406.

In certain aspects, the two subscriptions of the UE exhibiting SR-DSDS behavior may acquire service on the same cell. For example, a non-dedicated data subscription (nDDS) of the UE may acquire service on the same cell as a dedicated data subscription (DDS) of the UE. The DDS may be in a connected or idle mode, and the nDDS may be in an idle mode. The UE may operate in a SR-DSDS page sharing mode when the two subscriptions acquire service on the same cell. While the UE is operating in the SR-DSDS page sharing mode, the UE in association with the DDS may monitor pages (e.g., pages for CMAS broadcast) for the DDS and additionally for the nDDS, which helps avoid tune-aways on the DDS for any nDDS activities. An example of a UE facilitating an alert/warning message protection in MSIM using FCFS approach while the UE operates in SR-DSDS page sharing mode is shown in FIG. 5.

FIG. 5 is a second timing diagram 500 illustrating alert/warning message protection in MSIM using an FCFS approach while the UE is operating in SR-DSDS page sharing mode. The example provided with respect to FIG. 5 is with respect to CMAS messages, but generally, the messages may be any alert/warning messages and may include CMAS messages and/or ETWS messages. The approach applies to SR-DSDS page sharing mode. As illustrated in FIG. 5, at 512, a NW (i.e., base station associated with the network NW) 502 schedules a CMAS broadcast. At 514, the network NW 502 transmits paging information indicating that a SIB1 will be subsequently broadcasted. At 516, the network NW 502 broadcasts the SIB1, which includes scheduling information for a SIB 12 that contains the CMAS messages. At 516, a UE receives the SIB1. Specifically, the SIB1 is received in association with a first subscription 504. More specifically, a baseband processor (modem) at the UE receives the SIB1 at an RRC layer, where the SIB1 is associated with the first subscription 504. At 518, the UE in association with the first subscription 504 requests an FCFS lock from an FCFS lock module 506. At 520, the FCFS lock is granted by the FCFS lock module 506. The FCFS lock locks the TRM resources for and assigns the TRM resources to receiving the CMAS segments with the first subscription 504 associated with a first SIM. In page sharing mode, as the first subscription 504 associated with the first SIM and a second subscription 508 associated with a second SIM acquire service from the same cell, the CMAS segments received with the first subscription 504 associated with the first SIM includes CMAS segments for the second subscription 508 associated with the second SIM. In this manner, in a page sharing mode, the FCFS lock does not prevent the TRM resources from being used for receiving CMAS segments associated with the second subscription 508 associated with the second SIM. At 521, the network NW 502 broadcasts a plurality of SIB12s including the CMAS segments. At 522, the UE in association with first subscription receives the SIB12s using the TRM resources and begins decoding the CMAS segments received in the SIB12s. The CMAS segments may be associated with one or more message IDs.

At 524, the UE in association with the first subscription 504 completes receiving and decoding all the CMAS segments for the one or more message IDs. The UE in association with the first subscription 504 may form a decoded CMAS message based on the decoded CMAS segments. For example, the UE in association with the first subscription 504 may concatenate the decoded CMAS segments to form the decoded CMAS message. At 526, the UE in association with the first subscription 504 transmits the decoded CMAS message to AP. At 528, the UE in association with the first subscription 504 transmits the decoded CMAS message to the UE in association with the second subscription 508. In certain aspects, the UE in association with the first subscription 504 may be configured to decode the CMAS segments based on the message IDs associated with the CMAS segments. In certain aspects, the UE in association with the first subscription 504 may be configured to decode a CMAS segment as long as the message ID associated with the CMAS segment is part of a list of message IDs with which either the first subscription 504, the second subscription 508, or both are associated. In certain aspects, a message ID is associated with a subscription (e.g., a first subscription 504, a second subscription 508, and the like) if the message ID is of interest to that subscription. For example, if a message ID 1 is not of interest to the first subscription 504, and thus, not associated with the first subscription 504, but the message ID 1 is of interest to the second subscription 508, and thus associated with the second subscription 508, then the UE in association with the first subscription 504 decodes and/or reads the one or more CMAS segments associated with message ID 1 and transmits them to the UE in association with the second subscription 508. In certain aspects, the UE may receive one or more lists of message IDs from a network (e.g., network 502), where the message IDs are of interest to and/or associated with the subscriptions (e.g., first subscription 504, second subscription 508, and the like) associated with the UE.

The UE in association with the first subscription 504 may transmit the one or more message IDs associated with the CMAS segments to the UE in association with the second subscription 508 when transmitting the decoded CMAS message to the UE in association with the second subscription 508. Based on the one or more message IDs associated with the CMAS segments, the UE in association with the second subscription 508 may determine whether the decoded CMAS message is associated with the second subscription 508. At 530, if the decoded message is associated with the second subscription 508, the UE in association with the second subscription 508 transmits the decoded CMAS message to the AP. Subsequently, at 532, the network NW 502 de-schedules the CMAS broadcast, and at 534, transmits a page including de-scheduling information. At 534, the UE in association with the first subscription 504 receives the page including the CMAS broadcast de-scheduling information. At 538, the UE in association with the first subscription 504 releases the FCFS lock with the FCFS lock module 406.

FIG. 6 is a third timing diagram 600 illustrating alert/warning message protection in MSIM using an AP trigger approach. The example provided with respect to FIG. 6 is with respect to CMAS messages, but generally, the messages may be any alert/warning messages and may include CMAS messages and/or ETWS messages. The approach applies to SR-DSDS, including normal mode and page sharing mode. As illustrated in FIG. 6, at 612, a first network NW1 (i.e., base station associated with the first network NW1) 602 schedules a CMAS broadcast. At 614, the first network NW1 602 transmits paging information indicating that a SIB1 will be subsequently broadcasted. At 616, the first network NW1 602 broadcasts the SIB1, which includes scheduling information for a SIB12 that contains the CMAS messages. At 616, a UE receives the SIB1. Specifically, the SIB1 is received in association with a first subscription 604. More specifically, a baseband processor (modem) at the UE receives the SIB1 at an RRC layer, where the SIB1 is associated with the first subscription 604. At 618, the UE in association with the first subscription 604 requests an FCFS lock from an FCFS lock module 606. At 620, the FCFS lock is granted by the FCFS lock module 606. The FCFS lock locks the TRM resources for and assigns the TRM resources to receiving the CMAS segments with the first subscription 604 associated with a first SIM. The FCFS lock also prevents the TRM resources from being used for receiving CMAS segments associated with a second subscription 608 associated with a second SIM. At 621, the first network NW1 602 broadcasts a plurality of SIB12s including the CMAS segments. At 622, the UE receives the SIB 12s and begins decoding the CMAS segments received in the SIB12s. The CMAS segments are associated with one or more message IDs.

At 624, a second network NW2 (i.e., base station associated with the second network NW2) 610 schedules a CMAS broadcast. At 626, the second network NW2 610 transmits paging information indicating that a SIB1 will be subsequently broadcasted. At 628, the second network NW2 610 broadcasts the SIB1, which includes scheduling information for the SIB 12 that contains the CMAS messages. At 628, the UE receives the SIB1. Specifically, the SIB1 is received in association with a second subscription 608. More specifically, the baseband processor (modem) at the UE receives the SIB1 at an RRC layer, where the SIB1 is associated with the second subscription 608. At 630, as the TRM resources are assigned in association with the first subscription 604, the UE does not request an FCFS lock and ignores receiving and decoding the CMAS segments for the second subscription 608. Without the FCFS lock, had the UE in association with the second subscription 608 utilized the TRM resources to receive the corresponding CMAS message, the UE in association with the first subscription 604 may have failed to fully receive and decode the CMAS segments and may have therefore lost the corresponding CMAS message.

At 632, the UE in association with the first subscription 604 completes receiving and decoding all the CMAS segments for the message ID. Subsequently, at 634, the UE in association with the first subscription 604, sends the CMAS message to the AP 690. The AP 690 then provides the CMAS message to a user of the UE, such as through for example, display, sounds, vibrations, or the like. Subsequently, at 636, the UE releases the FCFS lock with the FCFS lock module 606 for the first subscription 604. At 638, the AP 690 triggers an increase in a TRM priority for the second subscription 608 if the second subscription 608 has a CMAS message to receive and decode. At 640, the UE in association with the second subscription 608 and in response to the trigger from the AP 690, increases the TRM priority for the second subscription 608 and grants the second subscription 608 the TRM resources for receiving/decoding the CMAS message. At 641, the second network NW2 610 broadcasts a plurality of SIB 12s including the CMAS segments. At 642, the UE in association with the second subscription 608 receives/decodes the CMAS segments to obtain the CMAS message. Thereafter, at 644, the second network NW2 610 de-schedules the CMAS broadcast. At 646, the second network NW2 610 transmits a page including the CMAS de-scheduling information. The UE in association with the second subscription 608 receives the page with the CMAS de-scheduling information.

FIG. 7 is a fourth timing diagram 700 illustrating alert/warning message protection in MSIM using a message stitching approach. The example provided with respect to FIG. 7 is with respect to CMAS messages, but generally, the messages may be any alert/warning messages and may include CMAS messages and/or ETWS messages. The approach applies to SR-DSDS. As illustrated in FIG. 7, at

712, a first network NW1 (i.e., base station associated with the first network NW1) 702 schedules a CMAS broadcast with a particular message ID. At 714, the first network NW1 702 transmits paging information indicating that a SIB1 will be subsequently broadcasted. At 716, the first network NW1 502 broadcasts the SIB1, which includes scheduling information for a SIB12 that contains the CMAS messages. At 716, a UE receives the SIB1. Specifically, the SIB1 is received in association with a first subscription 704. More specifically, a baseband processor (modem) at the UE receives the SIB1 at an RRC layer, where the SIB1 is associated with the first subscription 704. At 721, the first network NW1 702 broadcasts a plurality of SIB 12s including the CMAS segments. At 722, the UE receives at least one of the SIB12s and starts decoding the received CMAS segments. At 724, a second network NW2 (i.e., base station associated with the second network NW2) 710 schedules a CMAS broadcast with the same message ID as in 712. At 726, the second network NW2 710 transmits paging information indicating that a SIB1 will be subsequently broadcasted. At 728, the second network NW2 710 broadcasts the SIB1, which includes scheduling information for the SIB 12 that contains the CMAS messages. At 728, the UE receives the SIB1. Specifically, the SIB1 is received in association with a second subscription 708. More specifically, the baseband processor (modem) at the UE receives the SIB1 at an RRC layer, where the SIB1 is associated with the second subscription 708. At 741, the second network NW2 710 broadcasts a plurality of SIB12s including the CMAS segments. At 742, a priority of the second subscription 708 may be increased to be greater than a priority for the first subscription. Consequently, at 742, before the UE completes reception and decoding of the CMAS segments for the first subscription 704, the UE receives and decodes CMAS segments that the UE receives in association with the second subscription 708. Accordingly, the UE does not receive all of the CMAS segments at 722 to construct the CMAS message for the first subscription 704. At 770, as the CMAS segments from the first and second subscriptions 704, 708 have the same message ID, the UE combines the CMAS segments from the first and second subscriptions 704, 708 (possibly utilizing the same database) with RRC segment stitching in order to construct the CMAS message. At 772, the UE completes the receiving and the decoding of all the CMAS segments.

Figure 8:
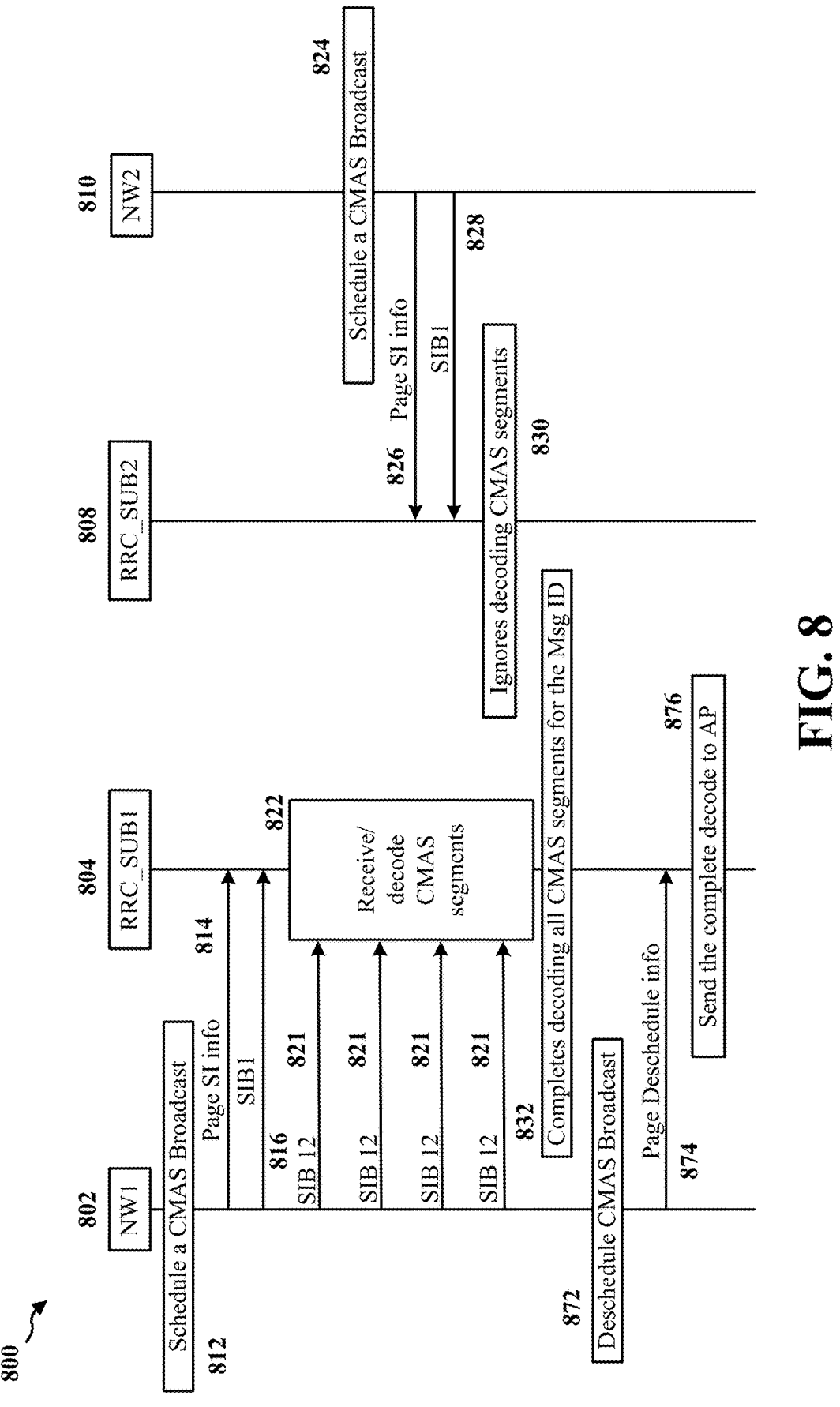
FIG. 8 is a fifth timing diagram illustrating alert/warning message protection in MSIM using an SSIM approach.

FIG. 8 is a fifth timing diagram 800 illustrating alert/warning message protection in MSIM using an SSIM approach. In the SSIM approach, a UE maintains TRM resources dedicated to a particular subscription until that subscription goes out of service (OOS). Once a subscription goes OOS, the TRM resources may be dedicated for a different subscription until that subscription itself goes OOS. The example provided with respect to FIG. 8 is with respect to CMAS messages, but generally, the messages may be any alert/warning messages and may include CMAS messages and/or ETWS messages. The approach applies to SR-DSDS. As illustrated in FIG. 8, at 812, a first network NW1 (i.e., base station associated with the first network NW1) 802 schedules a CMAS broadcast. At 814, the first network NW1 802 transmits paging information indicating that a SIB1 will be subsequently broadcasted. At 816, the first network NW1 802 broadcasts the SIB1, which includes scheduling information for a SIB12 that contains the CMAS messages. At 816, a UE receives the SIB1. Specifically, the SIB1 is received in association with a first subscription 804. More specifically, a baseband processor (modem) at the UE receives the SIB1 at an RRC layer, where the SIB1 is associated with the first subscription 804. At 821, the first network NW1 802 broadcasts a plurality of SIB12s including the CMAS segments. At 822, the UE receives the SIB12s and begins decoding the CMAS segments received in the SIB12s. The CMAS segments are associated with a particular message ID.

At 824, a second network NW2 (i.e., base station associated with the second network NW2) 810 schedules a CMAS broadcast. At 826, the second network NW2 810 transmits paging information indicating that a SIB1 will be subsequently broadcasted. At 828, the second network NW2 810 broadcasts the SIB1, which includes scheduling information for the SIB 12 that contains the CMAS messages. At 828, the UE receives the SIB1. Specifically, the SIB1 is received in association with a second subscription 808. More specifically, the baseband processor (modem) at the UE receives the SIB1 at an RRC layer, where the SIB1 is associated with the second subscription 808. At 830, the UE determines that the first subscription is still in service, and therefore the UE ignores receiving and decoding the CMAS segments for the second subscription 808. At 832, the UE in association with the first subscription 804 completes receiving and decoding all the CMAS segments for the message ID. Subsequently, at 872, the first network NW1 802 de-schedules the CMAS broadcast, and at 874, transmits a page including de-scheduling information. At 874, the UE receives the page with the de-scheduling information. At 876, the UE sends the complete decoded CMAS message to the AP.

In one configuration, the approach provided with respect to FIG. 8 may be applied if the first network NW1 802 and the second network NW2 810 are the same and/or the message IDs in the message lists from the first and second networks 802, 810 are the same (e.g., the message lists from the first and second networks 802, 810 are the same), where the UE ignores at 830 alert/warning messages with the same message ID as the UE receives at 822. In such a configuration, the UE does not lose any alert/warning messages by ignoring SIB 12 broadcasts at 830 from the second network NW2 810.

Figure 9:
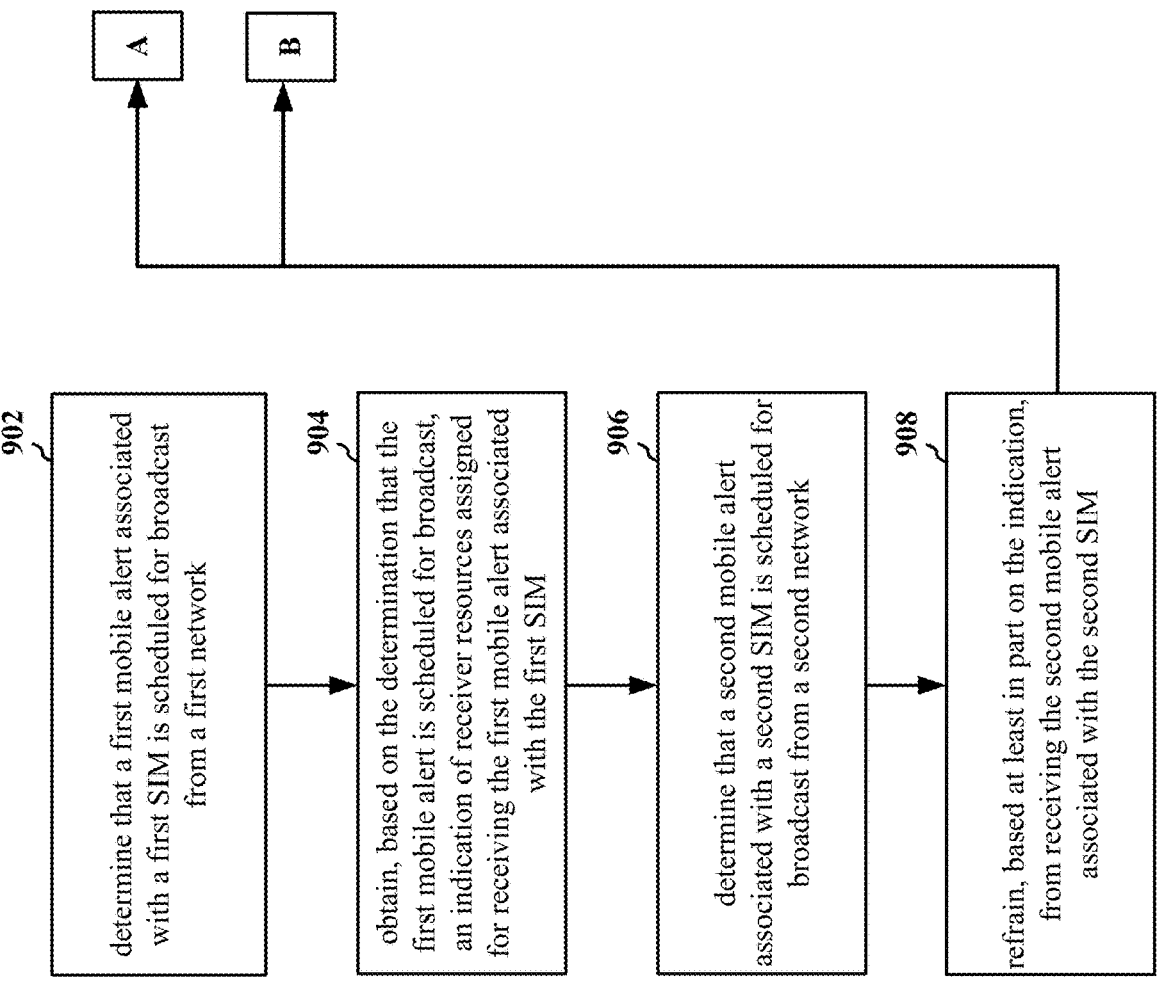
FIG. 9 is a first flowchart of a first method of wireless communication.

FIG. 9 is a first flowchart 900 of a first method of wireless communication. The flowchart 900 is associated with the FCFS configuration/approach. The method may be performed by a UE (e.g., the UE 104; the apparatus 1402). At 902, the UE determines that a first mobile alert associated with a first SIM is scheduled for broadcast from a first network. For example, referring to FIG. 4, the at 414, 416 the UE determines that a first mobile alert associated with a first SIM 404 is scheduled for broadcast from a first network 402. At 904, the UE obtains, based on the determination that the first mobile alert is scheduled for broadcast, an indication of receiver resources assigned for receiving the first mobile alert associated with the first SIM. For example, referring to FIG. 4, at 420, the UE obtains, based on the determination that the first mobile alert is scheduled for broadcast, an FCFS lock grant indication of receiver resources assigned for receiving the first mobile alert associated with the first SIM 404. At 906, the UE determines that a second mobile alert associated with a second SIM is scheduled for broadcast from a second network. For example, referring to FIG. 4, at 426, 428 the UE determines that a second mobile alert associated with a second SIM 408 is scheduled for broadcast from a second network 410. At 908, the UE refrains, based at least in part on the indication, from receiving the second mobile alert associated with the second SIM. For example, referring to FIG. 4, at 430, the UE refrains, based at least in part on the FCFS lock grant indication at 420, from receiving the second mobile alert associated with the second SIM 408. In certain aspects, a UE refraining from receiving a mobile alert associated with a SIM may include the UE declining to decode at least a portion of a message (e.g., SIB12, SIB1, and the like) from a network for that mobile alert.

In one configuration, at 904, the UE obtains the indication of the receiver resources being assigned for receiving the first mobile alert associated with the first SIM by locking a TRM module from requesting the receiver resources for receiving mobile alerts associated with other SIMs other than the first SIM. For example, referring to FIG. 4, at 420, the UE obtains the FCFS lock grant indication of the receiver resources being assigned for receiving the first mobile alert associated with the first SIM where a TRM module is locked/prevented from requesting the receiver resources for receiving mobile alerts associated with other SIMs other than the first SIM.

In one configuration, the first mobile alert and the second mobile alert are associated with messages from at least one of a CMAS or an ETWS.

In one configuration, the UE (e.g., 1402, modem 1404 of FIG. 14) sends the first mobile alert to an AP (e.g., see the AP 1406 of FIG. 14) for signaling the first mobile alert to a user of the UE.

Figure 10:
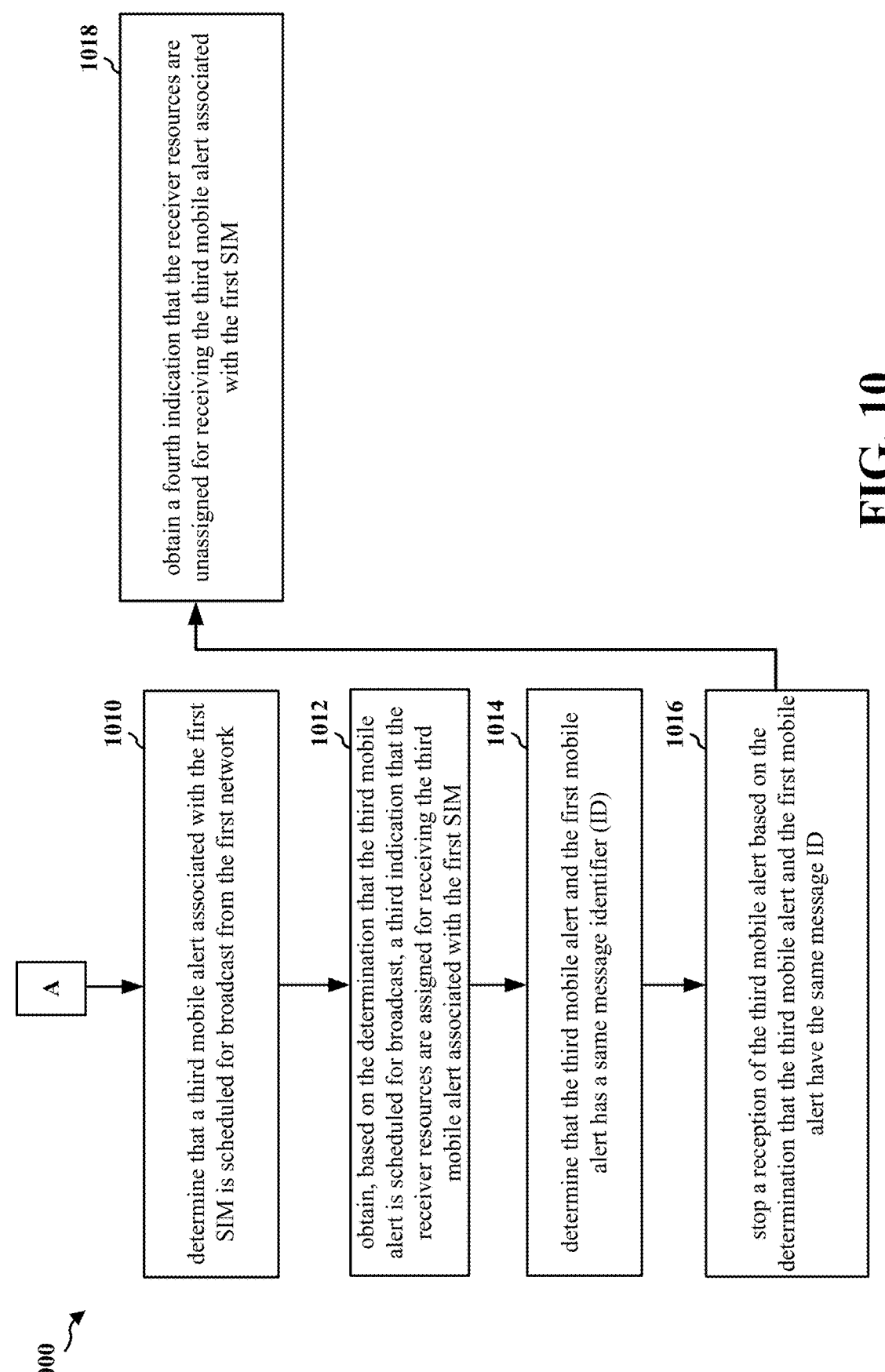
FIG. 10 is a second flowchart of the first method of wireless communication.

In one configuration, after 908, one or more blocks in A are performed with respect to FIG. 10. In another configuration, after 908, one or more blocks in B are performed with respect to FIG. 11.

FIG. 10 is a second flowchart 1000 of the first method of wireless communication. The flowchart 1000 is associated with the FCFS configuration/approach. The method may be performed by a UE (e.g., the UE 104; the apparatus 1402). At 1010, the UE determines that a third mobile alert associated with the first SIM is scheduled for broadcast from the first network. For example, referring to FIG. 4, at 442, the first SIM 404 receives the FCFS lock when the UE determines that a third mobile alert associated with the first SIM 404 is scheduled for broadcast from the first network 402. At 1012, the UE obtains, based on the determination that the third mobile alert is scheduled for broadcast, a third indication that the receiver resources are assigned for receiving the third mobile alert associated with the first SIM. For example, referring to FIG. 4, at 446, the UE obtains, based on the determination that the third mobile alert is scheduled for broadcast, a third FCFS lock grant indication that the receiver resources are assigned for receiving the third mobile alert associated with the first SIM 404. At 1014, the UE determines that the third mobile alert and the first mobile alert have the same message ID. For example, referring to FIG. 4, at 448, the UE determines that the third mobile alert and the first mobile alert have a same message ID. At 1016, the UE stops a reception of the third mobile alert based on the determination that the third mobile alert and the first mobile alert have the same message ID. For example, referring to FIG. 4, at 450, the UE stops a reception of the third mobile alert based on the determination that the third mobile alert and the first mobile alert have the same message ID. At 1018, the UE obtains a fourth indication that the receiver resources are unassigned for receiving the third mobile alert associated with the first SIM. For example, referring to FIG. 4, at 452, the UE obtains a fourth indication that the receiver resources are unassigned for receiving the third mobile alert associated with the first SIM 404, where the fourth indication indicates that the FCFS lock is released or transferred.

FIG. 11 is a third flowchart 1100 of the first method of wireless communication. The flowchart 1100 is associated with the AP trigger configuration/approach. The method may be performed by a UE (e.g., the UE 104; the apparatus 1602). At 1110, the UE obtains, upon completion of the receiving the first mobile alert, a second indication that the receiver resources are unassigned for receiving mobile alerts associated with the first SIM. For example, referring to FIG. 6, at 636, the UE obtains, upon completion of the receiving the first mobile alert at 632, a second indication that the receiver resources are unassigned for receiving mobile alerts associated with the first SIM 604. The UE may obtain the second indication of the receiver resources being unassigned for receiving the first mobile alert associated with the first SIM by unlocking a TRM module from being unable to request the receiver resources for receiving mobile alerts associated with other SIMs other than the first SIM. At 1112, the UE determines that a third mobile alert associated with the second SIM is scheduled for broadcast from the second network. For example, referring to FIG. 6, at 626, 628 the UE determines that one or more mobile alerts including a third mobile alert associated with the second SIM 608 is scheduled for broadcast from the second network 610. At 630, the UE ignores decoding mobile alert segments, but upon the release of the FCFS lock at 636, determines that at least one additional mobile alert (i.e., the third mobile alert) is scheduled for broadcast from the second network 610. At 1114, the UE receives a trigger for increasing the priority from an AP. For example, referring to FIG. 6, at 638, the UE receives a trigger for increasing the priority from an AP 690 (see also 1606 of FIG. 14). At 1116, the UE increases, based at least in part on the second indication, a priority of securing the receiver resources for receiving the third mobile alert. For example, referring to FIG. 6, at 640, the UE increases, based at least in part on the second indication, a priority of securing the receiver resources for receiving the third mobile alert. At 1118, the UE obtains, based on the increased priority for securing the receiver resources for receiving the third mobile alert, a third indication of the receiver resources being assigned for receiving the third mobile alert associated with the second SIM. For example, referring to FIG. 6, at 640, the UE obtains, based on the increased priority for securing the receiver resources for receiving the third mobile alert, a third indication of the receiver resources being assigned for receiving the third mobile alert associated with the second SIM. At 1120, the UE receives the third mobile alert through the receiver resources. For example, referring to FIG. 6, at 642, the UE receives the third mobile alert through the receiver resources.

FIG. 12 is a flowchart 1200 of a second method of wireless communication. The flowchart 1200 is associated with FCFS approach while the UE is operating in SR-DSDS page sharing mode. The method may be performed by a UE (e.g., the UE 104; the apparatus 1602). At 1202, the UE determines that a first mobile alert associated with a first SIM and a second SIM is scheduled for broadcast from a network. For example, referring to FIG. 5, at 514, 516, the UE determines that a first mobile alert associated with a first SIM 504 and a second SIM 508 is scheduled for broadcast from a network 502. At 1204, the UE in association with the first SIM, receives one or more message segments associated with the mobile alert. For example, referring to FIG. 5, at 522, the UE in association with the first subscription 504 receives the one or more message segments associated with the mobile alert. At 1206, the UE in association with the first SIM, decodes the one or more message segments associated with the mobile alert. For example, referring to FIG. 5, at

522, the UE in association with the first subscription decodes the received CMAS segments. At 1208, the UE in association with the first SIM, based on the one or more decoded message segments, transmits a decoded message to the UE in association with the second SIM. For example, referring to FIG. 5, at 528, the UE in association with the first subscription transmits the decoded message to the UE in association with the second subscription.

In one configuration, the UE (e.g., 1402, modem 1404 of FIG. 16) in association with the first SIM, transmitting the decoded message to an application processor (AP) (e.g., AP 1606 of FIG. 16) for signaling the mobile alert to a user of the UE.

In one configuration, the UE in association with the first SIM, transmits a set of message identifiers associated with the one or more decoded message segments to the UE in association with the second SIM.

In one configuration, the UE (e.g., 1602, modem 1604 of FIG. 16) in association with the second SIM, transmits, based on the received set of message identifiers, the decoded message to the application processor for signaling the mobile alert to a user of the UE.

Figure 16:
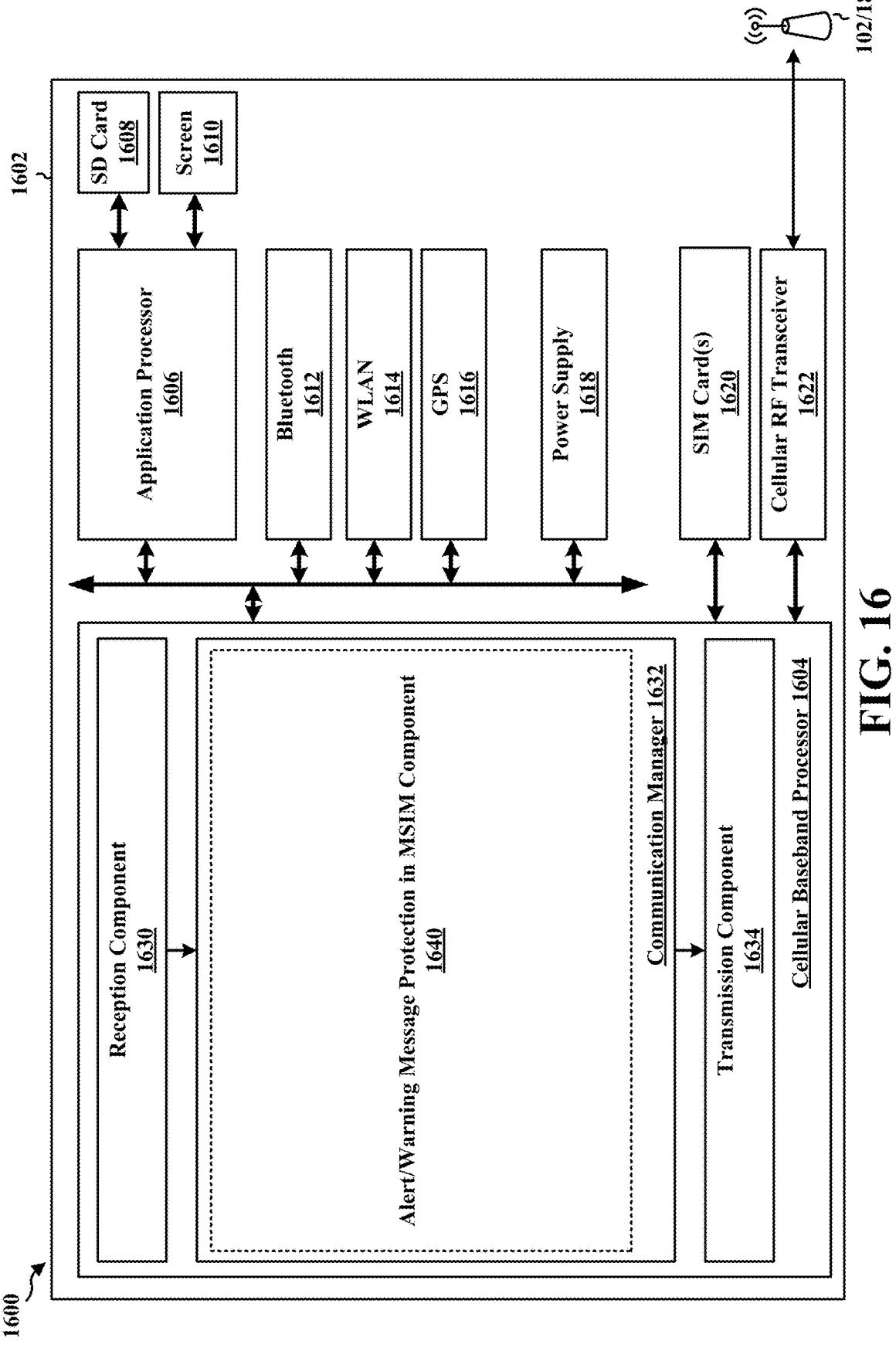
FIG. 16 is a diagram illustrating an example of a hardware implementation for an example apparatus.

In one configuration, the UE (e.g., 1602, modem 1604 of FIG. 16) in association with the second SIM, determine whether the received set of message identifiers is associated with the second SIM, and in response to determining that the received set of message identifiers is associated with the second SIM, transmitting, by the UE in association with the second SIM, the decoded message to the AP (e.g., AP 1606 of FIG. 16).

In one configuration, the UE (e.g., 1602 of FIG. 16) is operating in a page sharing mode.

In one configuration, the UE (e.g., 1602 of FIG. 16) in association with the first SIM obtains, based on the determination that the mobile alerts is scheduled for broadcast, an indication of receiver resources assigned for receiving the one or more mobile alerts. In one configuration, the UE (e.g., 1602 of FIG. 16) in association with the first SIM obtains the indicating of receiver resources assigned for receiving the one or more mobile alerts by locking a transceiver resource management (TRM) module from requesting resources for receiving mobile alerts. For example, referring to FIG. 5, at 520, the UE in association with the first SIM, may obtain an FCFS lock grant indication of receiver resources assigned for receiving the one or more mobile alerts based on the determination that the mobile alerts are scheduled for broadcast.

In one configuration, the mobile alert is associated with messages from at least one of a commercial mobile alert system (CMAS) or an earthquake and tsunami warning system (ETWS). In one configuration, the one or more message segments are associated with one or more messages from at least one of a CMAS or an ETWS.

Figure 13:
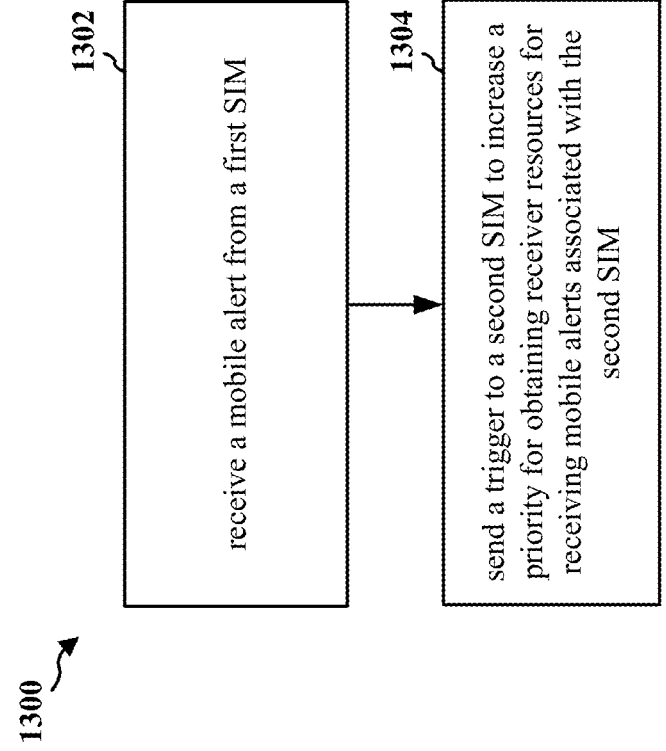
FIG. 13 is a flowchart of a third method of wireless communication.

FIG. 13 is a flowchart 1300 of a third method of wireless communication. The flowchart 1300 is associated with the AP trigger configuration/approach. The method may be performed by a UE (e.g., the UE 104; the apparatus 1402). At 1302, the UE receives a mobile alert from a first SIM. At 1304, the UE sends a trigger to a second SIM to increase a priority for obtaining receiver resources for receiving mobile alerts associated with the second SIM. For example, referring to FIG. 6, at 634, the AP 690 at the UE receives a mobile alert from a first SIM 604. In addition, at 638, the AP 690 at the UE sends a trigger to a second SIM 608 to increase a priority for obtaining receiver resources for receiving mobile alerts associated with the second SIM 608.

FIG. 14 is a flowchart 1400 of a fourth method of wireless communication. The flowchart 1400 is associated with the message stitching configuration/approach. The method may be performed by a UE (e.g., the UE 104; the apparatus 1402). At 1402, a UE receives at least a first portion of a first mobile alert associated with a first SIM. The first mobile alert is received from a first network. For example, referring to FIG. 7, at 722, a UE receives at least a first portion of a first mobile alert associated with a first SIM 704. The first mobile alert is received from a first network 702. At 1410, the UE receives at least a second portion of a second mobile alert associated with a second SIM. The second mobile alert is received from a second network. For example, referring to FIG. 7, at 742, the UE receives at least a second portion of a second mobile alert associated with a second SIM 708. At 1412, the UE determines that a first identifier of the first mobile alert and a second identifier of the second mobile alert are the same. At 1414, the UE combines, based on at least in part on the determination that the first identifier of the first mobile alert and the second identifier of the second mobile alert are the same, the at least the first portion of the first mobile alert and the at least the second portion of the second mobile alert. For example, referring to FIG. 7, at 742, the UE determines that a first identifier of the first mobile alert and a second identifier of the second mobile alert are the same, and then at 770, UE combines, based on at least in part on the determination that the first identifier of the first mobile alert and the second identifier of the second mobile alert are the same, the at least the first portion of the first mobile alert and the at least the second portion of the second mobile alert.

In one configuration, at 1408, the UE stops the receiving of the first mobile alert before the first mobile alert is received completely in order to receive the second mobile alert. For example, referring to FIG. 7, UE stops the receiving of the first mobile alert at 722 before the first mobile alert is received completely in order to receive the second mobile alert at 742.

In one configuration, at 1404, the UE determines, while receiving the at least the first portion of the first mobile alert, that the second mobile alert associated with the second SIM is scheduled for broadcast. For example, referring to FIG. 7, at 726, 728, the UE determines, while receiving the at least the first portion of the first mobile alert, that the second mobile alert associated with the second SIM 708 is scheduled for broadcast. In addition, at 1406, the UE sets a priority of receiving the second mobile alert to a priority higher than a priority for receiving the first mobile alert. For example, as discussed supra in relation to 742, the UE may set a priority of receiving the second mobile alert to a priority higher than a priority for receiving the first mobile alert. In such a configuration, at 1408, the UE stops the receiving the first mobile alert based on the second mobile alert having a higher priority than the first mobile alert. For example, referring to FIG. 7, the UE stops receiving the first mobile alert at 722 based on the second mobile alert having a higher priority than the first mobile alert.

In one configuration, the UE (e.g., 1602, modem 1604 of FIG. 16) sends the first mobile alert to an application AP (e.g., 1606 of FIG. 16) for signaling the first mobile alert to a user of the UE.

Figure 15:
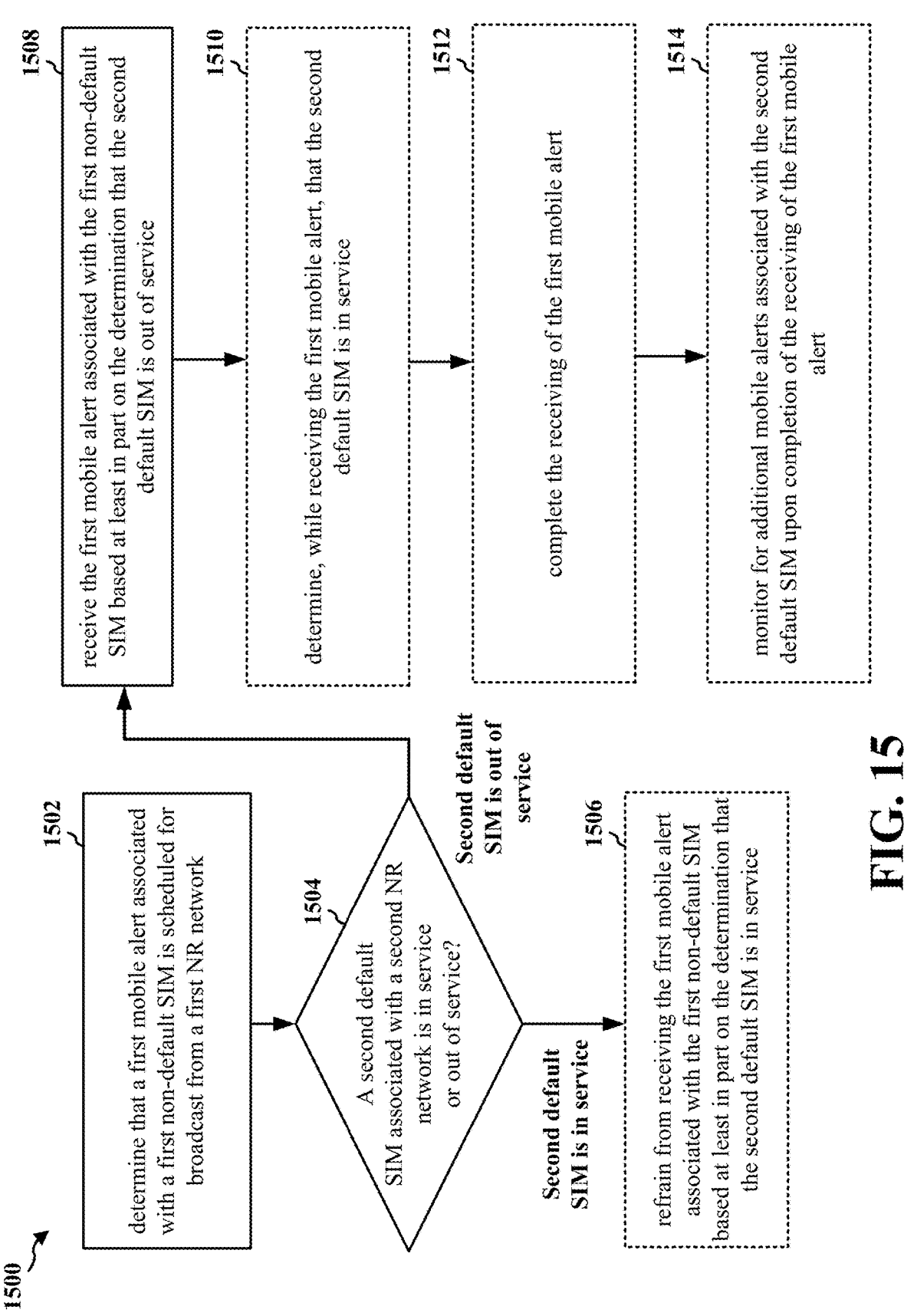
FIG. 15 is a flowchart of a fifth method of wireless communication.

FIG. 15 is a flowchart 1500 of a fifth method of wireless communication. The flowchart 1500 is associated with the SSIM configuration/approach. The method may be performed by a UE (e.g., the UE 104; the apparatus 1402). At 1502, the UE determines that a first mobile alert associated with a first non-default SIM is scheduled for broadcast from a first NR network. For example, referring to FIG. 8, 826, 828, the UE determines that a first mobile alert associated with a first non-default SIM 808 is scheduled for broadcast from a first NR network 810. At 1504, the UE determines whether a second default SIM associated with a second NR network is in service or out of service. At 1508, when the second default SIM is out of service, the UE receives the first mobile alert associated with the first non-default SIM based at least in part on the determination that the second default SIM is out of service. For example, as discussed supra in relation to FIG. 8, the UE determines whether a second default SIM 804 associated with a second NR network 802 is in service or out of service, and when the second default SIM 804 is out of service, the UE receives the first mobile alert associated with the first non-default SIM 808 based at least in part on the determination that the second default SIM 804 is out of service.

In one configuration, at 1506, when the second default SIM is in service, the UE refrains from receiving the first mobile alert associated with the first non-default SIM based at least in part on the determination that the second default SIM is in service. For example, referring to FIG. 8, when the second default SIM 804 is in service, at 830, the UE refrains from receiving the first mobile alert associated with the first non-default SIM 808 based at least in part on the determination that the second default SIM 804 is in service.

In one configuration, after 1508 at 1510, the UE determines, while receiving the first mobile alert, that the second default SIM is in service. In addition, at 1512, the UE completes receiving the first mobile alert. Further, at 1514, the UE monitors for additional mobile alerts associated with the second default SIM upon completion of the receiving of the first mobile alert.

In one configuration, the UE (e.g., 1602, modem 1604 of FIG. 16) sends the first mobile alert to an AP (e.g., 1606 of FIG. 16) for signaling the first mobile alert to a user of the UE.

FIG. 16 is a diagram 1600 illustrating an example of a hardware implementation for an apparatus 1602. The apparatus 1602 is a UE and includes a cellular baseband processor 1604 (also referred to as a modem) coupled to a cellular RF transceiver 1622 and one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, and a power supply 1618. The cellular baseband processor 1604 communicates through the cellular RF transceiver 1622 with the UE 104 and/or BS 102/180. The cellular baseband processor 1604 may include a computer-readable medium/memory. The cellular baseband processor 1604 is responsible for general processing, including the execution of software stored on the computer-readable medium/memory. The software, when executed by the cellular baseband processor 1604, causes the cellular baseband processor 1604 to perform the various functions described supra. The computer-readable medium/memory may also be used for storing data that is manipulated by the cellular baseband processor 1604 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the cellular baseband processor 1604. The cellular baseband processor

1604 may be a component of the UE 350 and may include the memory 360 and/or at least one of the TX processor 368, the RX processor 356, and the controller/processor 359. In one configuration, the apparatus 1602 may be a modem chip and include just the baseband processor 1604, and in another configuration, the apparatus 1602 may be the entire UE (e.g., sec 350 of FIG. 3) and include the aforediscussed additional modules of the apparatus 1602.

In a first configuration, the communication manager 1632 includes an alert/warning message protection in MSIM component 1640 that is configured to obtain, based on a first mobile alert associated with a first subscriber identity module (SIM) being scheduled for broadcast from a first network, an indication of receiver resources assigned for receiving the first mobile alert associated with the first SIM. In addition, the component 1640 is configured to refrain, based at least in part on the indication, from receiving a second mobile alert associated with a second SIM scheduled from a second network.

In one configuration, the component 1640 is configured to obtain the indication of the receiver resources being assigned for receiving the first mobile alert associated with the first SIM by locking a TRM module from requesting the receiver resources for receiving mobile alerts associated with other SIMs other than the first SIM. In one configuration, the first mobile alert and the second mobile alert are associated with messages from at least one of a CMAS or an ETWS. In one configuration, the component 1640 is configured to obtain, upon completion of the receiving the first mobile alert, a second indication that the receiver resources are unassigned for receiving mobile alerts associated with the first SIM. In one configuration, the component 1640 is configured to obtain the second indication of the receiver resources being unassigned for receiving the first mobile alert associated with the first SIM by unlocking a TRM module from being unable to request the receiver resources for receiving mobile alerts associated with other SIMs other than the first SIM. In one configuration, the component 1640 is further configured to determine that a third mobile alert associated with the second SIM is scheduled for broadcast from the second network. In addition, the component 1640 is configured to increase, based at least in part on the second indication, a priority of securing the receiver resources for receiving the third mobile alert. In addition, the component 1640 is configured to obtain, based on the increased priority for securing the receiver resources for receiving the third mobile alert, a third indication of the receiver resources being assigned for receiving the third mobile alert associated with the second SIM. Further, the component 1640 is configured to receive the third mobile alert through the receiver resources. In one configuration, the component 1640 is configured to receive a trigger for increasing the priority from an AP 1606, wherein the priority is increased based on the received trigger. In one configuration, the component 1640 is configured to determine that a third mobile alert associated with the first SIM is scheduled for broadcast from the first network, and to obtain, based on the determination that the third mobile alert is scheduled for broadcast, a third indication that the receiver resources are assigned for receiving the third mobile alert associated with the first SIM. In one configuration, the component 1640 is configured to determine that the third mobile alert and the first mobile alert have a same message ID, to stop a reception of the third mobile alert based on the determination that the third mobile alert and the first mobile alert have the same message ID, and to obtain a fourth indication that the receiver resources are unassigned for receiving the third mobile alert associated with the first SIM. In one configuration, the component 1640 is configured to send the first mobile alert to an AP 1606 for signaling the first mobile alert to a user (e.g., through the screen/display 1610) of the UE 1602.

In a second configuration, the AP 1606 is configured to receive a mobile alert from a first SIM at 1604, and to send a trigger to a second SIM at 1604 to increase a priority for obtaining receiver resources for receiving mobile alerts associated with the second SIM at 1604.

In a third configuration, the communication manager 1632 includes an alert/warning message protection in MSIM component 1640 that is configured to receive at least a first portion of a first mobile alert associated with a first SIM. The first mobile alert is received from a first network. In addition, the component 1640 is configured to receive at least a second portion of a second mobile alert associated with a second SIM. The second mobile alert is received from a second network. In addition, the component 1640 is configured to determine that a first identifier of the first mobile alert and a second identifier of the second mobile alert are the same. Further, the component 1640 is configured to combine, based on at least in part on the determination that the first identifier of the first mobile alert and the second identifier of the second mobile alert are the same, the at least the first portion of the first mobile alert and the at least the second portion of the second mobile alert.

In one configuration, the component 1640 is configured to stop the receiving of the first mobile alert before the first mobile alert is received completely in order to receive the second mobile alert. On one configuration, the component 1640 is configured to determine, while receiving the at least the first portion of the first mobile alert, that the second mobile alert associated with the second SIM is scheduled for broadcast. In addition, the component 1640 is configured to set a priority of receiving the second mobile alert to a priority higher than a priority for receiving the first mobile alert. The component 1640 is configured to stop receiving the first mobile alert based on the second mobile alert having a higher priority than the first mobile alert. In one configuration, the component 1640 is configured to send the first mobile alert to an AP 1606 for signaling the first mobile alert to a user (e.g., through the screen/display 1610) of the UE.

In a fourth configuration, the communication manager 1632 includes an alert/warning message protection in MSIM component 1640 that is configured to determine that a first mobile alert associated with a first non-default SIM is scheduled for broadcast from a first NR network, to determine whether a second default SIM associated with a second NR network is in service or out of service, and to receive the first mobile alert associated with the first non-default SIM based at least in part on the determination that the second default SIM is out of service.

In one configuration, the component 1640 is configured to refrain from receiving the first mobile alert associated with the first non-default SIM based at least in part on the determination that the second default SIM is in service. In one configuration, the component 1640 is configured to determine, while receiving the first mobile alert, that the second default SIM is in service. In addition, the component 1640 is configured to complete the receiving of the first mobile alert. Further, the component 1640 is configured to monitor for additional mobile alerts associated with the second default SIM upon completion of the receiving of the first mobile alert. In one configuration, the component 1640 is configured to send the first mobile alert to an AP 1606 for signaling the first mobile alert to a user (e.g., through the screen/display 1610) of the UE.

In a fifth configuration, the communication manager 1632 includes an alert/warning message protection in MSIM component 1640 that is configured to receive, in association with the first SIM, one or more message segments associated with the mobile alert. In addition, the component 1640, is configured to decode, in association with the first SIM, the one or more segments associated with the mobile alert. In addition, the component 1640, is configured to transmit, in association with the first SIM, based on the one or more decoded message segments, a decoded message to the UE in association with a second SIM.

In one configuration, the component 1640 is configured to transmit, in association with the first SIM, the decoded message to an application processor (AP) for signaling the mobile alert to a user of the UE. In one configuration, the component 1640 is configured to transmit, in association with the first SIM, a set of message identifiers associated with the one or more decoded message segments to the UE in association with the second SIM. In one configuration, the component 1640 is configured to transmit, in association with the second SIM, based on the received set of message identifiers, the decoded message to the application processor (AP) for signaling the mobile alert to a user of the UE.

In one configuration, the component 1640 is configured to transmit the decoded message to the AP by determining, in association with the second SIM, whether the received set of message identifiers is associated with the second SIM, and in response to determining that the received set of message identifiers is associated with the second SIM, transmitting, in association with the second SIM, the decoded message to the AP. In one configuration, the component 1640 is configured to operate in a page sharing mode. In one configuration, the component 1640 is configured to obtain, in association with the first SIM, based on the determination that the mobile alerts is scheduled for broadcast, an indication of receiver resources assigned for receiving the one or more mobile alerts. In one configuration, the component 1640 is configured to obtain the indication of the receiver resources being assigned for receiving the mobile alert associated with the first SIM and/or the second SIM by locking a transceiver resource management (TRM) module from requesting the receiver resources for receiving mobile alerts.

In one configuration, the mobile alert is associated with messages from at least one of a commercial mobile alert system (CMAS) or an earthquake and tsunami warning system (ETWS). In one configuration, the one or more message segments are associated with one or more messages from at least one of a commercial mobile alert system (CMAS) or an earthquake and tsunami warning system (ETWS). In one configuration, the component 1640 is configured to determine that the mobile alert associated with at least the first SIM and/or the second SIM is scheduled for broadcast from a network. In one configuration, the mobile alert is associated with at least the first SIM and the second SIM.

The apparatus may include additional components that perform each of the blocks of the algorithm in the afore-mentioned flowcharts of FIGS. 9-15. As such, each block in the aforementioned flowcharts of FIGS. 9-15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for imple-mentation by a processor, or some combination thereof.

In one configuration, the apparatus 1602, and in particular the cellular baseband processor (modem) 1604, includes means for obtaining, based on a first mobile alert associated with a first subscriber identity module (SIM) being sched-uled for broadcast from a first network, an indication of receiver resources assigned for receiving the first mobile alert associated with the first SIM. In addition, the apparatus 1602/modem 1604 means for refraining, based at least in part on the indication, from receiving a second mobile alert associated with a second SIM scheduled for broadcast from a second network. In one configuration, the apparatus 1602/modem 1604 may further include means for obtaining the indication of the receiver resources being assigned for receiving the first mobile alert associated with the first SIM is configured to lock a TRM module from requesting the receiver resources for receiving mobile alerts associated with other SIMs other than the first SIM. In one configura-tion, the first mobile alert and the second mobile alert are associated with messages from at least one of a CMAS or an ETWS. In one configuration, the apparatus 1602/modem 1604 may further include means for obtaining, upon completion of the receiving the first mobile alert, a second indication that the receiver resources are unassigned for receiving mobile alerts associated with the first SIM. In one configuration, the apparatus 1602/modem 1604 may further include means for obtaining the second indication of the receiver resources being unassigned for receiving the first mobile alert associated with the first SIM is configured to unlock a TRM module from being unable to request the receiver resources for receiving mobile alerts associated with other SIMs other than the first SIM. In one configura-tion, the apparatus 1602/modem 1604 may further include means for determining that a third mobile alert associated with the second SIM is scheduled for broadcast from the second network. In such a configuration, the apparatus 1602/modem 1604 may further include means for increas-ing, based at least in part on the second indication, a priority of securing the receiver resources for receiving the third mobile alert. In such a configuration, the apparatus 1602/modem 1604 may further include means for obtaining, based on the increased priority for securing the receiver resources for receiving the third mobile alert, a third indi-cation of the receiver resources being assigned for receiving the third mobile alert associated with the second SIM. In such a configuration, the apparatus 1602/modem 1604 may further include means for receiving the third mobile alert through the receiver resources. In one configuration, the apparatus 1602/modem 1604 may further include means for receiving a trigger for increasing the priority from an AP 1606. The priority may be increased based on the received trigger. In one configuration, the apparatus 1602/modem 1604 may further include means for determining that a third mobile alert associated with the first SIM is scheduled for broadcast from the first network, and means for obtaining, based on the determination that the third mobile alert is scheduled for broadcast, a third indication that the receiver resources are assigned for receiving the third mobile alert associated with the first SIM. In one configuration, the apparatus 1602/modem 1604 may further include means for determining that the third mobile alert and the first mobile alert have a same message ID, means for stopping a recep-tion of the third mobile alert based on the determination that the third mobile alert and the first mobile alert have the same message ID, and means for obtaining a fourth indication that the receiver resources are unassigned for receiving the third mobile alert associated with the first SIM. In one configuration, the apparatus 1602/modem 1604 may further include means for sending the first mobile alert to an AP 1606 for signaling the first mobile alert to a user of the UE. In one configuration, the apparatus 1602/modem 1604 may further include means for determining that the first mobile alert associated with the first SIM is scheduled for broadcast from the first network. In one configuration, the apparatus 1602/ modem 1604 may further include means for determining that the second mobile alert associated with the second SIM is scheduled for broadcast from the second network.

In one configuration, the apparatus 1602, and in particular the AP 1606, includes means for receiving a mobile alert from a first SIM, and means for sending a trigger to a second SIM to increase a priority for obtaining receiver resources for receiving mobile alerts associated with the second SIM.

In one configuration, the apparatus 1602, and in particular the cellular baseband processor (modem) 1604, includes means for receiving at least a first portion of a first mobile alert associated with a first SIM. The first mobile alert is received from a first network. The apparatus 1602/modem 1604 further includes means for receiving at least a second portion of a second mobile alert associated with a second SIM. The second mobile alert is received from a second network. The apparatus 1602/modem 1604 further includes means for determining that a first identifier of the first mobile alert and a second identifier of the second mobile alert are the same. The apparatus 1602/modem 1604 further includes means for combining, based on at least in part on the determination that the first identifier of the first mobile alert and the second identifier of the second mobile alert are the same, the at least the first portion of the first mobile alert and the at least the second portion of the second mobile alert. In one configuration, the apparatus 1602/modem 1604 further includes means for stopping the receiving of the first mobile alert before the first mobile alert is received completely in order to receive the second mobile alert. In one configuration, the apparatus 1602/modem 1604 further includes means for determining, while receiving the at least the first portion of the first mobile alert, that the second mobile alert associated with the second SIM is scheduled for broadcast. In such a configuration, the apparatus 1602/ modem 1604 further includes means for setting a priority of receiving the second mobile alert to a priority higher than a priority for receiving the first mobile alert. The means for stopping the receiving of the first mobile alert is based on the second mobile alert having a higher priority than the first mobile alert. In one configuration, the apparatus 1602/ modem 1604 further includes means for sending the first mobile alert to an AP 1606 for signaling the first mobile alert to a user of the UE.

In one configuration, the apparatus 1602, and in particular the cellular baseband processor (modem) 1604, includes means for determining that a first mobile alert associated with a first non-default SIM is scheduled for broadcast from a first NR network, means for determining whether a second default SIM associated with a second NR network is in service or out of service, and means for receiving the first mobile alert associated with the first non-default SIM based at least in part on the determination that the second default SIM is out of service. In one configuration, the apparatus 1602/modem 1604 further includes means for refraining from receiving the first mobile alert associated with the first non-default SIM based at least in part on the determination that the second default SIM is in service. In one configuration, the apparatus 1602/modem 1604 further includes means for determining, while receiving the first mobile alert, that the second default SIM is in service, means for completing the receiving of the first mobile alert, and means for monitoring for additional mobile alerts associated with the second default SIM upon completion of the receiving of the first mobile alert. In one configuration, the apparatus 1602/ modem 1604 further includes means for sending the first mobile alert to an AP 1606 for signaling the first mobile alert to a user of the UE.

In one configuration, the apparatus 1602, and in particular the cellular baseband processor (modem) 1604, includes means for receiving, in association with a first SIM, one or more message segments associated with a mobile alert. In addition, the apparatus 1602/ modem 1604 further includes means for decoding, by the UE in association with the first SIM, the one or more message segments associated with the mobile alert. In addition, the apparatus 1602/ modem 1604 further includes means for transmitting, by the UE in association with the first SIM, based on the one or more decoded message segments, a decoded message to the UE in association with a second SIM. In one configuration, the apparatus 1602/ modem 1604 may further include means for transmitting, by the UE in association with the first SIM, the decoded message to an application processor (AP) for signaling the mobile alert to a user of the UE. In one configuration, the apparatus 1602/ modem 1604 may further include means for transmitting, by the UE in association with the first SIM, a set of message identifiers associated with the one or more decoded message segments to the UE in association with the second SIM. In one configuration, the apparatus 1602/ modem 1604 may further include means for transmitting, by the UE in association with the second SIM, based on the received set of message identifiers, the decoded message to the application processor (AP) for signaling the mobile alert to a user of the UE. In one configuration, the apparatus 1602/modem 1604 may further include means for transmitting the decoded message to the application processor (AP) is configured to determine, by the UE in association with the second SIM, whether the received set of message identifiers is associated with the second SIM, and transmit, by the UE in association with the second SIM, the decoded message to the AP, in response to determining that the received set of message identifiers is associated with the second SIM. In one configuration, the apparatus 1602/ modem 1604 may be configured to operate in a page sharing mode. In one configuration, the apparatus 1602/modem 1604 may further include means for obtaining, by the UE in association with the first SIM, based on the determination that the mobile alerts is scheduled for broadcast, an indication of receiver resources assigned for receiving the one or more mobile alerts. In one configuration, the apparatus 1602/modem 1604 may further include means for obtaining the indication of the receiver resources being assigned for receiving the mobile alert associated with the first SIM and the second SIM is configured to lock, by the UE in association with the firs SIM, a transceiver resource management (TRM) module from requesting the receiver resources for receiving mobile alerts. In one configuration, the mobile alert is associated with messages from at least one of a commercial mobile alert system (CMAS) or an earthquake and tsunami warning system (ETWS). In one configuration, the one or more message segments are associated with one or more messages from at least one of a commercial mobile alert system (CMAS) or an earthquake and tsunami warning system (ETWS). In one configuration, the apparatus 1602/ modem 1604 may further include means for determining that a mobile alert associated with at least the first SIM and/or the second SIM is scheduled for broadcast from the network. In one configuration, the mobile alert is associated with at least the first SIM and the second SIM.

The aforementioned means may be one or more of the aforementioned components of the apparatus 1602 configured to perform the functions recited by the aforementioned means. As described supra, the apparatus 1602 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

As discussed supra, under some circumstances, a UE with SR-DSDS behavior may lose alert/warning messages associated with multiple different SIMs. In order to prevent the loss of alert/warning messages, different configurations/approaches for alert/warning message protection in MSIM are provided. The configurations/approaches include an FCFS configuration/approach, an AP trigger configuration/approach, a message stitching configuration/approach, and an SSIM configuration/approach. When the UE is receiving alert/warning messages from multiple SIMs, the provided configurations/approaches help prevent the UE from losing the alert/warning messages from at least one of the multiple SIMs, and in some situations, help prevent the UE from losing the alert/warning messages from each of the multiple SIMs.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   receiving, by the UE in association with a first subscriber identity module (SIM), one or more message segments associated with a mobile alert;
   decoding, by the UE in association with the first SIM, the one or more message segments associated with the mobile alert;
   sharing, by the UE, a decoded message, including the one or more decoded message segments decoded from the one or more message segments received in association with the first SIM, with a second SIM of the UE;
   sending, by the UE and in association with the first SIM, the decoded message, including the one or more decoded message segments decoded from the one or more message segments received in association with the first SIM, to an application processor (AP) for signaling the mobile alert; and
   sending, by the UE and in association with the second SIM, the decoded message, including the one or more decoded message segments decoded from the one or more message segments received in association with the first SIM, to the AP for signaling the mobile alert.

2. The method of claim 1, further comprising:
   sharing, by the UE and in association with the first SIM, a set of message identifiers associated with the one or more decoded message segments with the second SIM.

3. The method of claim 2, wherein sending the decoded message, in association with the second SIM, to the AP is based on the set of message identifiers.

4. The method of claim 3, wherein sending the decoded message to the AP further comprises:
   determining, by the UE and in association with the second SIM, whether the received set of message identifiers is associated with the second SIM; and
   based on determining that the received set of message identifiers is associated with the second SIM, sending, by the UE and in association with the second SIM, the decoded message to the AP.

5. The method of claim 1, wherein the mobile alert is associated with at least the first SIM and the second SIM.

6. The method of claim 1, further comprising:
   obtaining, by the UE and in association with the first SIM, based on a determination that the mobile alert is scheduled for broadcast, an indication of receiver resources assigned for receiving the one or more mobile alerts.

7. An apparatus for wireless communication, the apparatus being a user equipment (UE), comprising:
   a memory; and at least one processor coupled to the memory and configured to:

receive, by the UE in association with a first subscriber identity module (SIM), one or more message segments associated with a mobile alert;

decode, by the UE in association with the first SIM, the one or more message segments associated with the mobile alert;

share, by the UE, a decoded message, including based on the one or more decoded message segments decoded from the one or more message segments received in association with the first SIM, with a second SIM of the UE;

send, by the UE and in association with the first SIM, the decoded message, including the one or more decoded message segments decoded from the one or more message segments received in association with the first SIM, to an application processor (AP) for signaling the mobile alert; and send, by the UE and in association with the second SIM, the decoded message, including the one or more decoded message segments decoded from the one or more message segments received in association with the first SIM, to the AP for signaling the mobile alert.

8. The apparatus of claim 7, wherein the at least one processor is configured to:

share, by the UE and in association with the first SIM, a set of message identifiers associated with the one or more decoded message segments with the second SIM.

9. The apparatus of claim 8, wherein the at least one processor is configured to:

send, by the UE and in association with the second SIM, the decoded message to the AP further based on the set of message identifiers.

10. The apparatus of claim 9, wherein to send the decoded message to an AP, the at least one processor is configured to:

determine, by the UE and in association with the second SIM, whether the received set of message identifiers is associated with the second SIM; and based on determining that the received set of message identifiers is associated with the second SIM, send, by the UE and in association with the second SIM, the decoded message to the AP.

11. The apparatus of claim 7, wherein the mobile alert is associated with at least the first SIM and a second SIM.

12. The apparatus of claim 7, wherein the at least one processor is configured to:

obtain, by the UE and in association with the first SIM, based on a determination that the mobile alert is scheduled for broadcast, an indication of receiver resources assigned for receiving the one or more mobile alerts.

13. A non-transitory computer-readable medium, comprising code executable by one or more processors for wireless communications of a user equipment (UE), the code comprising code for:

receiving, by the UE in association with a first subscriber identity module (SIM), one or more message segments associated with a mobile alert;

decoding, by the UE in association with the first SIM, the one or more message segments associated with the mobile alert;

sharing, by the UE, a decoded message, including the one or more decoded message segments decoded from the one or more message segments received in association with the first SIM, with a second SIM of the UE;

sending, by the UE and in association with the first SIM, the decoded message, including the one or more decoded message segments decoded from the one or more message segments received in association with the first SIM, to an application processor (AP) for signaling the mobile alert; and sending, by the UE and in association with the second SIM, the decoded message, including the one or more decoded message segments decoded from the one or more message segments received in association with the first SIM, to the AP for signaling the mobile alert.

14. The non-transitory computer-readable medium of claim 13, the code further comprising code for:

sharing, by the UE and in association with the first SIM, a set of message identifiers associated with the one or more decoded message segments with the second SIM.

15. The non-transitory computer-readable medium of claim 14, wherein the code for sending, by the UE and in association with the second SIM, the decoded message to the AP sends the decoded message based on the set of message identifiers.

16. The non-transitory computer-readable medium of claim 15, wherein the code for sending sends the decoded message to the AP including:

determining, by the UE and in association with the second SIM, whether the received set of message identifiers is associated with the second SIM; and based on determining that the received set of message identifiers is associated with the second SIM, sending, by the UE and in association with the second SIM, the decoded message to the AP.

17. The non-transitory computer-readable medium of claim 13, wherein the mobile alert is associated with at least the first SIM and the second SIM.

* * * * *